US008152686B2

(12) United States Patent
Toki

(10) Patent No.: US 8,152,686 B2
(45) Date of Patent: Apr. 10, 2012

(54) DRIVE TRANSMISSION DEVICE AND INK JET RECORDING APPARATUS

(75) Inventor: Nobuhiro Toki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 440 days.

(21) Appl. No.: 12/537,360

(22) Filed: Aug. 7, 2009

(65) Prior Publication Data

US 2010/0045724 A1 Feb. 25, 2010

(30) Foreign Application Priority Data

Aug. 22, 2008 (JP) ................................ 2008-214121

(51) Int. Cl.
*F16H 3/62* (2006.01)

(52) U.S. Cl. ....................................................... 475/323

(58) Field of Classification Search .................. 475/323, 475/326
See application file for complete search history.

(56) References Cited

U.S. PATENT DOCUMENTS

| | | | | |
|---|---|---|---|---|
| 5,199,805 | A * | 4/1993 | Kawazoe et al. | 400/248 |
| 5,752,096 | A | 5/1998 | Ichino et al. | 396/85 |
| 6,167,198 | A | 12/2000 | Ichino et al. | 396/48 |
| 6,175,694 | B1 | 1/2001 | Ichino et al. | 396/132 |
| 6,215,958 | B1 | 4/2001 | Ichino et al. | 396/48 |
| 6,317,564 | B1 | 11/2001 | Ichino et al. | 396/85 |
| 6,890,282 | B2 * | 5/2005 | Oberstarr | 475/323 |
| 7,731,620 | B2 * | 6/2010 | Hukill et al. | 475/275 |

FOREIGN PATENT DOCUMENTS

| | | |
|---|---|---|
| JP | 1-258972 | 10/1989 |
| JP | 4-258930 | 9/1992 |
| JP | 2002-310260 | 10/2002 |

* cited by examiner

*Primary Examiner* — Edwin A Young
(74) *Attorney, Agent, or Firm* — Fitzpatrick, Cella, Harper & Scinto

(57) ABSTRACT

In the revolving restricted state, the planetary gear meshes with the drive input gear, and the clutch mechanism is unable to transmit the rotational drive force; in the freely revolvable state, the planetary gear is separated apart from the drive input gear, and the clutch mechanism is able to transmit the rotational drive force, the drive transmission switching mechanism is provided with first and second abutting portions which are configured to come into contact with the planetary arm rotated in the freely revolvable state so as to initialize the revolving position of the planetary gear, and the drive transmission switching mechanism is capable of selecting which one of the first and second abutting portions will come into contact with the planetary arm in accordance with the position of the drive input gear transmitting the rotational drive force among the plurality of drive input gears.

21 Claims, 14 Drawing Sheets

DRIVE TRANSMISSION DEVICE AND INK JET RECORDING APPARATUS

BACKGROUND OF THE INVENTION

1. Field of the Invention

The present invention relates to a drive transmission device that uses a planetary gear mechanism. The present invention also relates to an ink jet recording apparatus that discharges ink on a recording medium, thereby performing recording by using such a drive transmission device.

2. Description of the Related Art

Hitherto, recording apparatuses have been known which include a feeding mechanism for feeding a sheet as a recording medium to the inside thereof, a conveying mechanism for conveying the fed sheet, a recording mechanism for recording data or images on the fed sheet, and a discharge mechanism for discharging the recorded sheet outside the recording apparatus. The recording apparatuses are also provided with a drive source for operating the respective mechanisms and a drive transmission mechanism.

Among such recording apparatuses, ink jet recording apparatuses include a recording head as the recording mechanism and discharge ink on a sheet, thereby recording data or images thereon. Many of the ink jet recording apparatus are provided with a head recovery mechanism having a suction pump in order to maintain a normal ink discharge state of the recording head or recover to the normal ink discharge state in cases of clogged ink discharge ports.

As described above, a plurality of different mechanisms are mounted in the recording apparatus, and drive sources such as motors are provided in order to drive the respective mechanisms on an as needed basis. In many cases, such a recording apparatus is provided with a drive transmission switching mechanism in order to selectively transmit the drive force of one drive source to the plurality of mechanisms. A known construction of the drive transmission switching mechanism uses a planetary gear mechanism. The use of the planetary gear mechanism enables the number of drive sources or the number of drive-related components to be reduced. As a result, the ink jet recording apparatus can be manufactured at low cost and with small size, and the reliability thereof can be improved by simplifying the mechanisms.

For instance, a construction is known which uses a planetary gear mechanism so that one of two different drive transmission destinations is selected between forward rotational drive and reverse rotational drive (reference should be made, for example, to Japanese Patent No. 2,628,686). However, the above construction cannot properly perform the drive transmission if there are more than two drive transmission destinations. Moreover, in the above construction, one-directional rotational drive force can be transmitted to one drive transmission destination. However, bi-directional rotational drive force in both normal and reverse rotation directions cannot be transmitted to one drive transmission destination.

Moreover, a construction is known which uses a planetary gear mechanism that is rotated in the forward rotation direction, allowing a planetary gear to revolve and that is rotated in the reverse rotation direction, transmitting drive force to a drive transmission destination, so that drive force can be transmitted to two or more drive transmission destinations (reference should be made, for example, to Japanese Patent Application Laid-Open No. 2002-310260). However, in the above construction, only one-directional rotational drive force can be transmitted to one drive transmission destination.

Furthermore, a construction is known in which an additional drive source such as solenoid is provided exclusively for a drive transmission switching mechanism (reference should be made, for example, to Japanese Patent No. 2,855,580). The construction enables a state where a planetary gear is freely revolvable and a state where the revolving movement is restricted to be switched between, so that the drive force in both normal and reverse rotation directions can be transmitted to more than two drive transmission destinations. However, the above construction requires having a drive source exclusively for the drive transmission switching mechanism and a detector such as a sensor for detecting the revolving position of the planetary gear.

Moreover, if the number of drive transmission destinations is increased, the revolving angle of the planetary gear, when initializing the revolving position of the planetary gear, is increased. As a result, the revolving movement of the planetary gear takes time, and thus, the time taken to complete the drive transmission switching operation increases.

SUMMARY OF THE INVENTION

An object of the present invention is to provide a drive transmission device and an ink jet recording apparatus capable of achieving a fast switching operation and an improvement in the reliability of the switching operation by a drive transmission switching mechanism.

According to an aspect of the present invention, there is provided a drive transmission device including a drive source capable of producing a rotational drive force and a drive transmission unit capable of transmitting the rotational drive force of the drive source. The drive transmission device further includes a drive transmission switching mechanism having a sun gear, a planetary gear, and a planetary arm capable of supporting the planetary gear so as to be freely revolvable around the sun gear, the drive transmission switching mechanism being capable of selectively switching the rotational drive force from the drive transmission unit to a plurality of drive transmission destinations. Further, the drive transmission device includes a plurality of drive input gears capable of transmitting the rotational drive force transmitted from the drive transmission switching mechanism to the drive transmission destinations; a clutch mechanism capable of switching a revolving state of the planetary gear between a freely revolvable state where the rotational drive force of the sun gear is transmitted to the planetary arm so that the planetary arm is able to rotate and a revolving restricted state where the rotational drive force of the sun gear is not transmitted to the planetary arm so that the planetary arm is unable to rotate; and a revolving state switching unit capable of operating the clutch mechanism by moving the planetary gear in an axial direction of the center of revolution, thereby switching between the revolving restricted state and the freely revolvable state. In the revolving restricted state, the planetary gear meshes with the drive input gear, and the clutch mechanism is unable to transmit the rotational drive force. In the freely revolvable state, the planetary gear is separated apart from the drive input gear, and the clutch mechanism is able to transmit the rotational drive force. The drive transmission switching mechanism is provided with first and second abutting portions which are configured to come into contact with the planetary arm rotated in the freely revolvable state so as to initialize the revolving position of the planetary gear. The drive transmission switching mechanism is capable of selecting which one of the first and second abutting portions will come into contact with the planetary arm in accordance with the position of the drive input gear transmitting the rotational drive force among the plurality of drive input gears.

According to another aspect of the present invention, there is provided a drive transmission device including a drive source capable of producing a rotational drive force and a drive transmission unit capable of transmitting the rotational drive force of the drive source. The drive transmission device further includes a drive transmission switching mechanism having a sun gear, a planetary gear, and a planetary arm capable of supporting the planetary gear so as to be freely revolvable around the sun gear, the drive transmission switching mechanism being capable of selectively switching the rotational drive force from the drive transmission unit to a plurality of drive transmission destinations. Further, the drive transmission device includes a plurality of drive input gears capable of transmitting the rotational drive force transmitted from the drive transmission switching mechanism to the drive transmission destinations; a clutch mechanism capable of switching a revolving state of the planetary gear between a freely revolvable state where the rotational drive force of the sun gear is transmitted to the planetary arm so that the planetary arm is able to rotate and a revolving restricted state where the rotational drive force of the sun gear is not transmitted to the planetary arm so that the planetary arm is unable to rotate; and a revolving state switching unit capable of operating the clutch mechanism by moving the planetary gear in an axial direction of the center of revolution, thereby switching between the revolving restricted state and the freely revolvable state. In the freely revolvable state, the planetary gear is separated apart from the sun gear and the drive input gear, the clutch mechanism is able to transmit the rotational drive force, and the revolving state switching unit is moved to a first position where it comes into contact with the drive transmission switching mechanism. In the revolving restricted state, the planetary gear meshes with the sun gear and the drive input gear, respectively, the clutch mechanism is unable to transmit the rotational drive force, and the revolving state switching unit is moved to a second position where it is separated apart from the drive transmission switching mechanism. The planetary gear has a revolving standby state where the planetary gear meshes with the sun gear and the drive input gear, respectively, the clutch mechanism is unable to transmit the rotational drive force, and the revolving state switching unit is moved to a third position located between the first position and the second position.

In accordance with the aspects of the present invention, since the first and second abutting portions are provided to initialize the revolving position of the planetary gear, the abutting portion which is brought into contact with the planetary arm, thereby initializing the revolving position, can be selected from the two abutting portions in accordance with the position of the drive input gear transmitting the drive force. Owing to such a construction, a faster drive transmission switching operation and an improvement in the reliability thereof can be achieved.

Further features of the present invention will become apparent from the following description of exemplary embodiments with reference to the attached drawings.

DESCRIPTION OF THE EMBODIMENTS

Exemplary embodiments of the present invention will now be described with reference to the drawings.

First Exemplary Embodiment

The description of an ink jet recording apparatus mounting thereon a drive transmission device according to the first exemplary embodiment will be provided.

Figure 1:
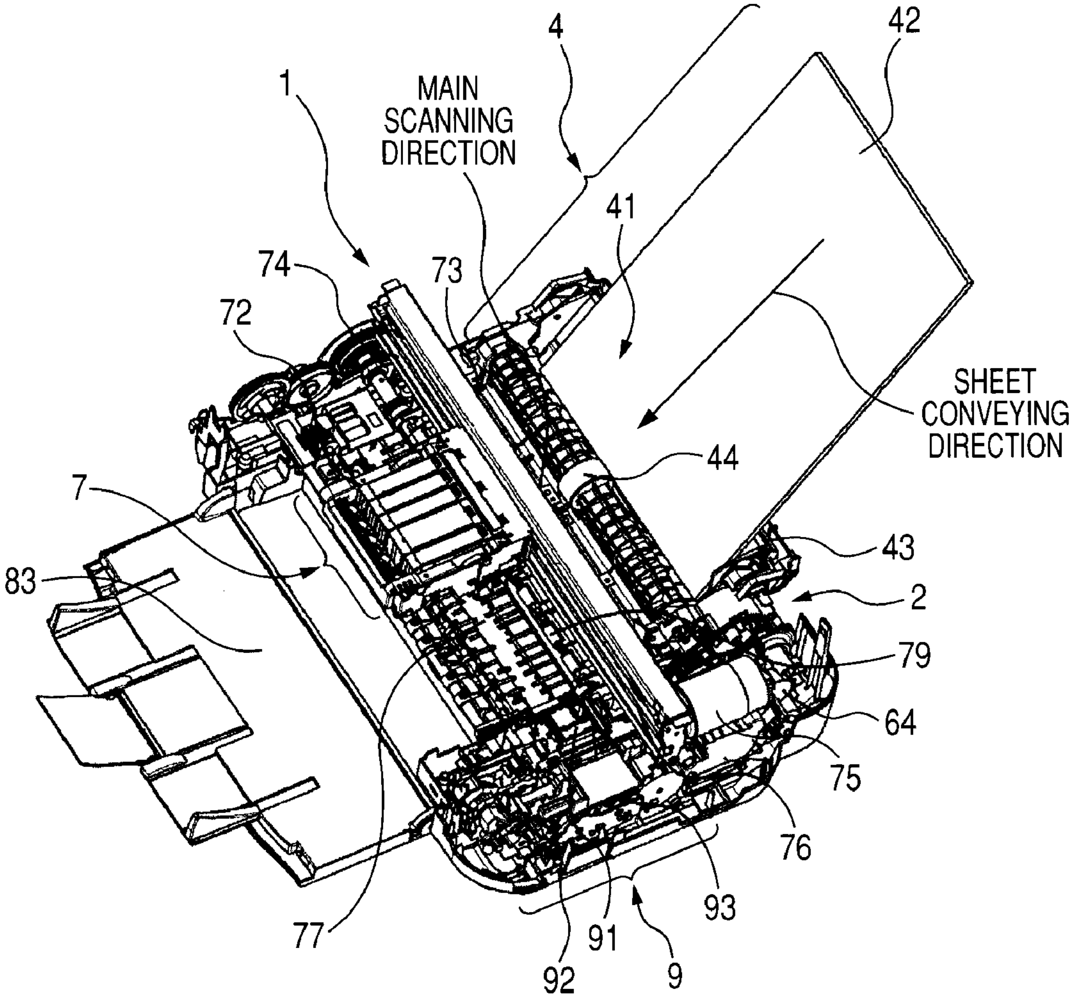
FIG. 1 is a perspective view illustrating a simplified construction of an ink jet recording apparatus.
Figure 2:
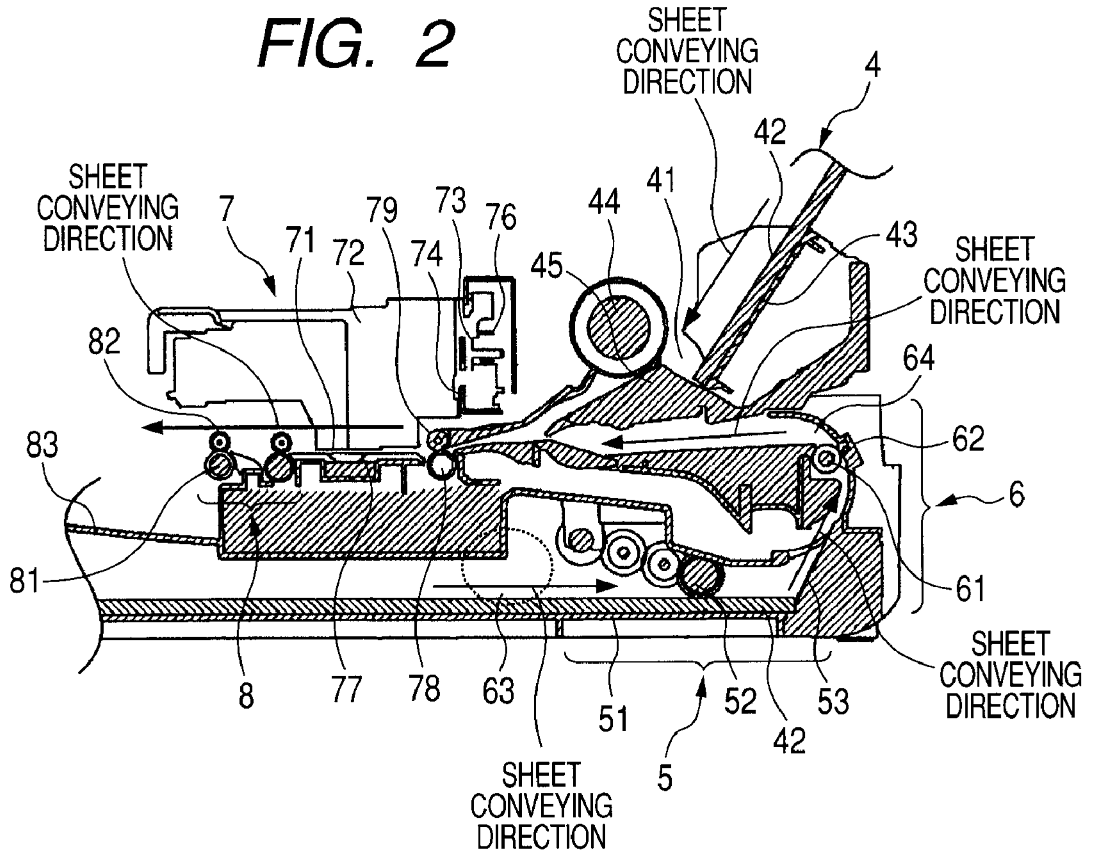
FIG. 2 is a sectional view illustrating a simplified construction of the ink jet recording apparatus.

First, the description of the simplified construction of the ink jet recording apparatus 1 will be provided with reference to FIGS. 1 to 2. FIG. 1 is a perspective view illustrating the simplified construction of the ink jet recording apparatus, and FIG. 2 is a sectional view illustrating the simplified construction of the ink jet recording apparatus.

Sheets 42 as a recording medium are stacked and held in a feeding opening 41 of a feeding mechanism 4. The sheets 42 are stacked on a pressure plate 43 which is provided on the lower portion of the feeding opening 41. A feeding roller 44 is disposed on an opposite side of the pressure plate 43, and the pressure plate 43 is urged toward the feeding roller 44 by a non-illustrated pressure plate spring. A separation roller 45 is also urged toward the feeding roller 44 by a non-illustrated separation roller spring. A sheet path downstream from the separation roller 45 in the conveying direction converges into a later-described cassette conveying sheet path 64 to be connected to a later-described recording mechanism 7.

In the recording mechanism 7, a recording head 71 is mounted on a carriage 73, and non-illustrated ink discharge ports are formed on the lower surface of the recording head 71. On the opposite side of the ink discharge ports, a platen 77 is disposed with a predetermined clearance between them. An LF roller 78 is disposed upstream to the platen 77 in the direction of conveying the sheet 42, and an LF pinch roller 79 is urged toward the LF roller 78 by a non-illustrated spring. Moreover, a discharge roller 81 is disposed downstream from the platen 77 in the conveying direction, and a spur 82 is urged toward the discharge roller 81 by a non-illustrated spring. Furthermore, a discharge tray 83 is disposed further downstream from the discharge roller 81 in the conveying direction.

An ink tank 72 is also mounted on the carriage 73 together with the recording head 71 so that ink is supplied from the ink tank 72 to the recording head 71. A drive force of a carriage motor 75 is transmitted to the recording head 71 via a carriage belt 76 which is a timing belt. Owing to such a construction, the carriage 73 can reciprocate along a carriage rail 74 in the main scanning direction (namely, the direction vertically intersecting the direction of conveying the sheet 42).

A head recovery mechanism 9 is disposed outside the range of main scanning for recording data or images on the sheet 42, and a cap 91 is disposed in the head recovery mechanism 9 in parallel to the platen 77. A suction pump 92 is connected to the cap 91 by a non-illustrated tube. A wiper 93 is disposed in the vicinity of the cap 91.

In this exemplary embodiment, an ink jet recording apparatus provided with an additional feeding opening different from the feeding opening 41 will be described as an example. A cassette feeding mechanism 5 is disposed in the bottom portion of the ink jet recording apparatus 1. The cassette feeding mechanism 5 is configured to include a cassette 51, a cassette feeding roller 52, and a cassette separation portion 53. The sheets 42 are stacked on the cassette 51, the cassette separation portion 53 and the cassette feeding roller 52 are disposed in the vicinity of the front end of the sheet 42 in the conveying direction thereof, and a cassette conveying mechanism 6 is disposed downstream from the conveying direction. A cassette conveying roller 61 is provided to the cassette conveying sheet path 64 of the cassette conveying mechanism 6, and a cassette conveying pinch roller 62 is urged toward the cassette conveying roller 61 by a non-illustrated cassette conveying pinch roller spring. Moreover, the cassette conveying sheet path 64 is connected to draw an arc so that the sheet 42 is conveyed between the cassette separation portion 53 and the recording mechanism 7. A cassette conveying motor 63 is provided in the vicinity of the side face of the cassette feeing mechanism 6, so that the rotational drive of the cassette conveying motor 63 is transmitted to the cassette conveying roller 61 via a non-illustrated drive train.

Figure 3:
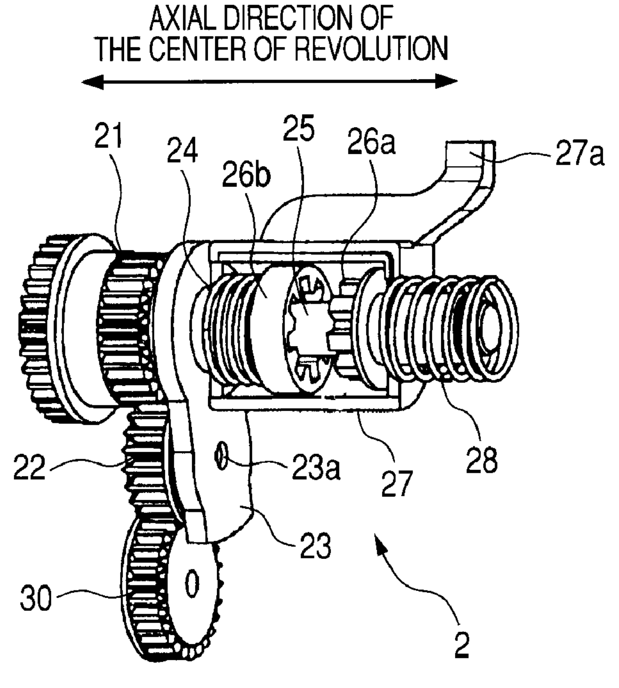
FIG. 3 is a perspective view illustrating a drive transmission switching mechanism.
Figure 4:
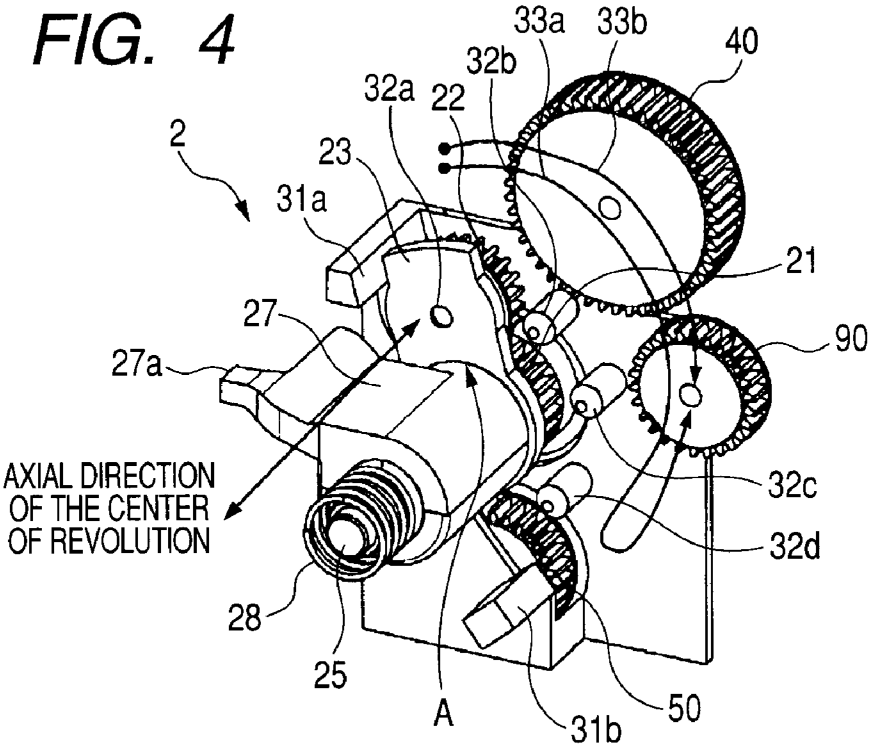
FIG. 4 is a perspective view illustrating a neutral position of the drive transmission switching mechanism.
Figure 5:
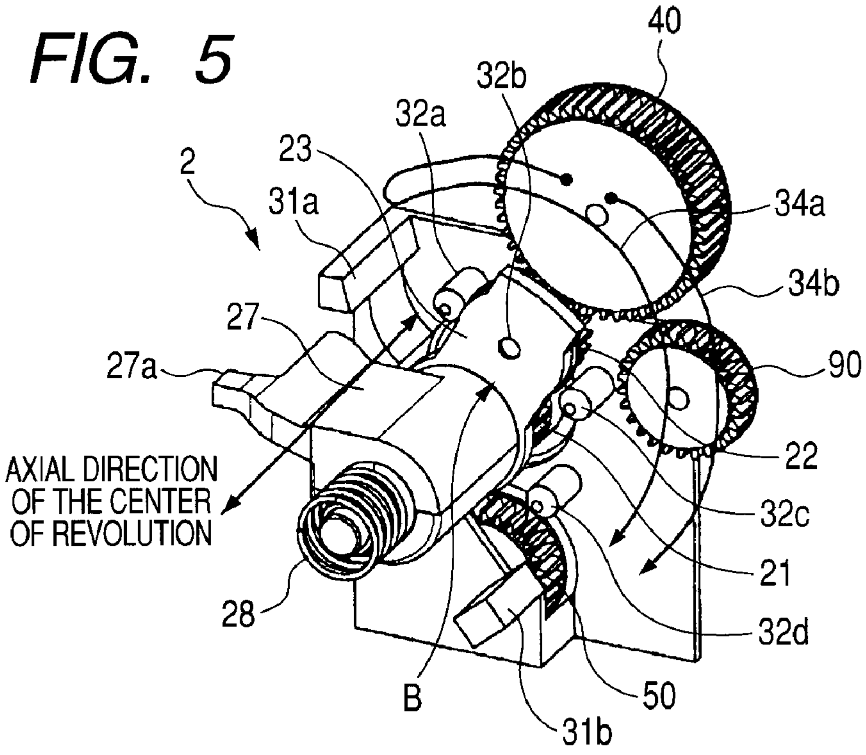
FIG. 5 is a perspective view illustrating a feeding position of the drive transmission switching mechanism.
Figure 6:
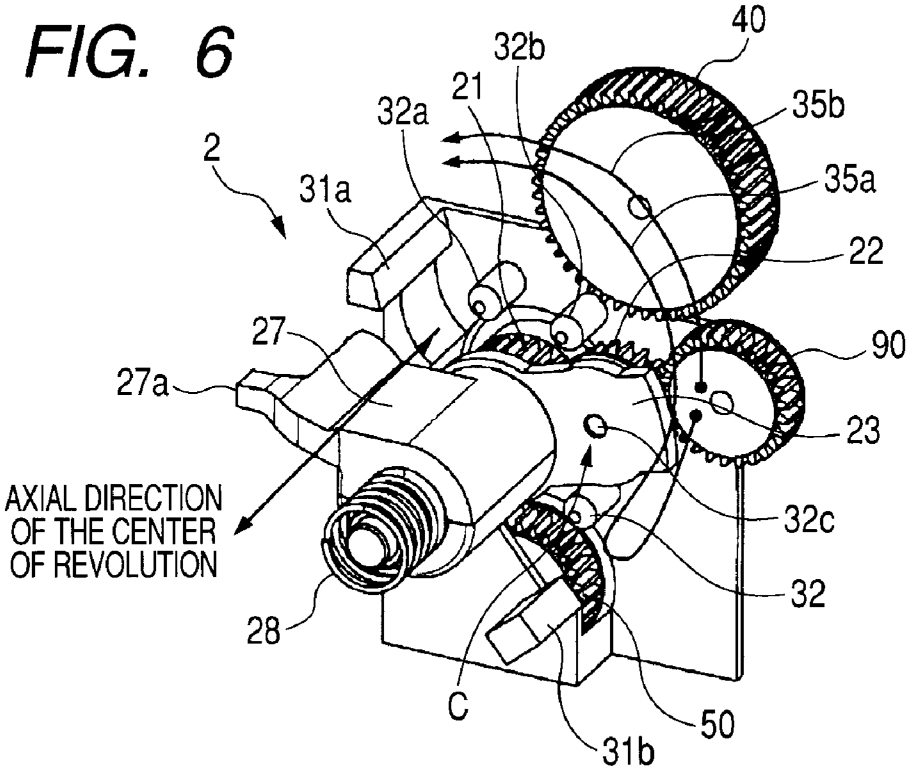
FIG. 6 is a perspective view illustrating a head recovery position of the drive transmission switching mechanism.
Figure 7:
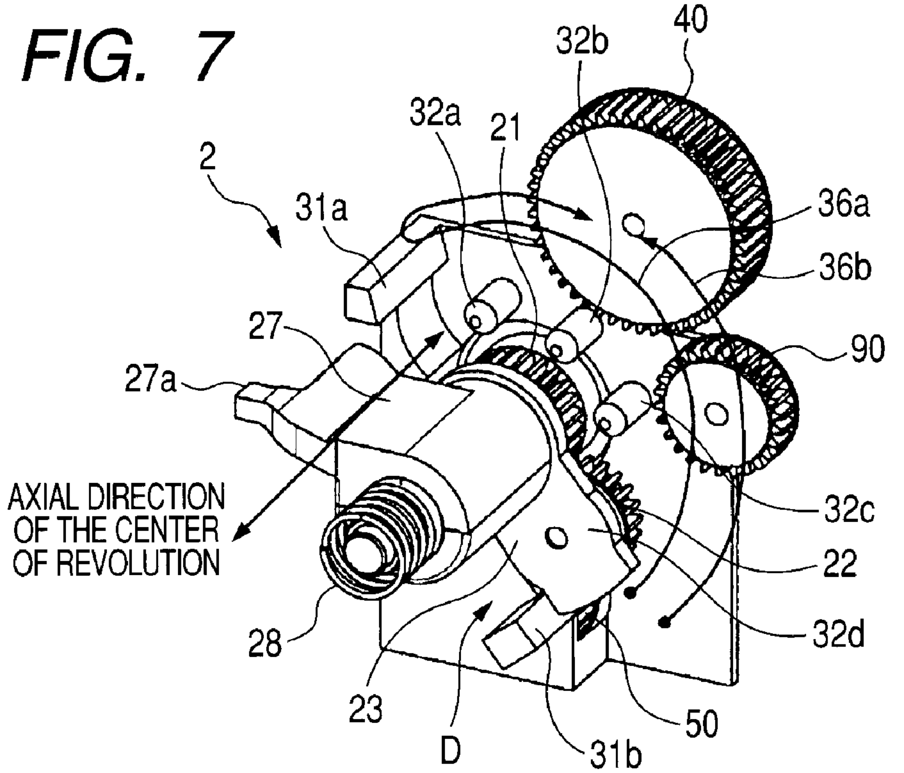
FIG. 7 is a perspective view illustrating a cassette feeding position of the drive transmission switching mechanism.
Figure 8:
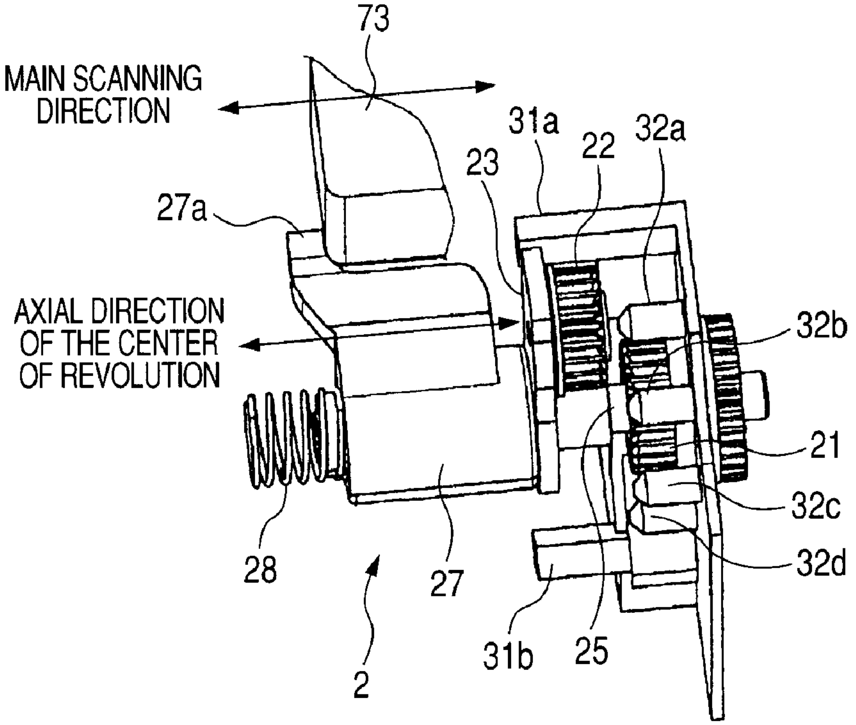
FIG. 8 is a perspective view illustrating a state where a planetary arm comes into contact with a first revolving abutment rib in the drive transmission switching mechanism.
Figure 9:
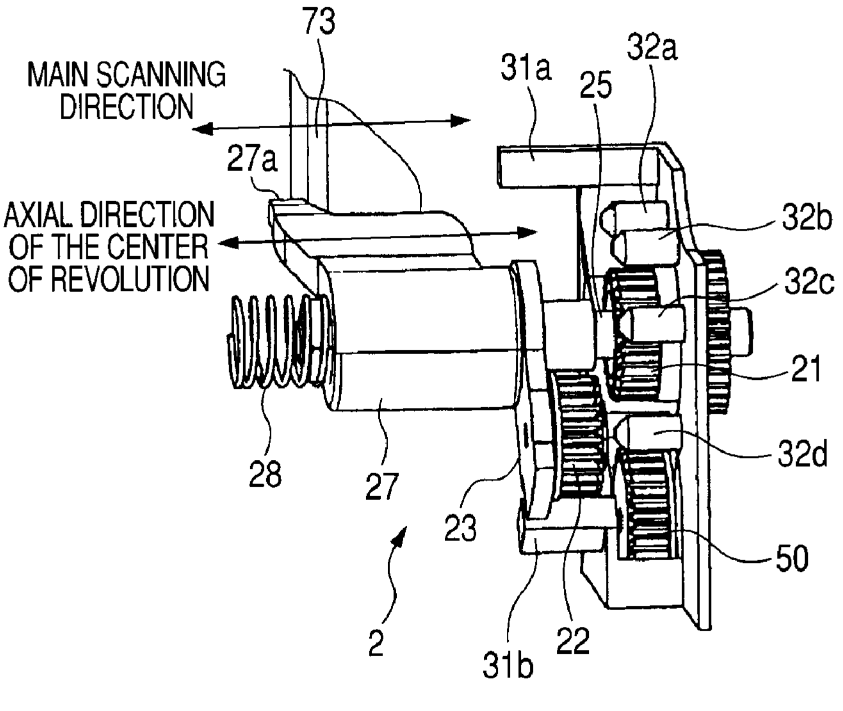
FIG. 9 is a perspective view illustrating a state where the planetary arm comes into contact with a second revolving abutment rib in the drive transmission switching mechanism.
Figure 15:
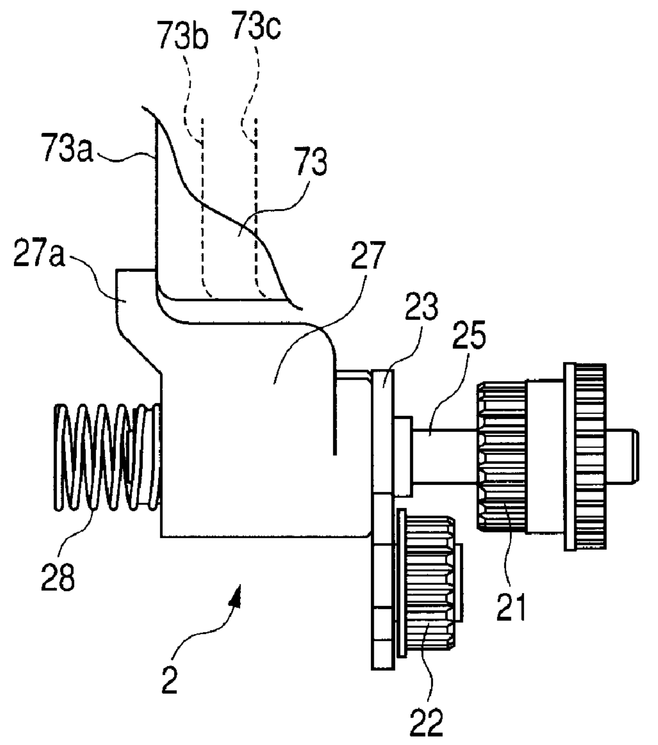
FIG. 15 is a top plan view illustrating a freely revolvable state of the drive transmission switching mechanism.
Figure 18:
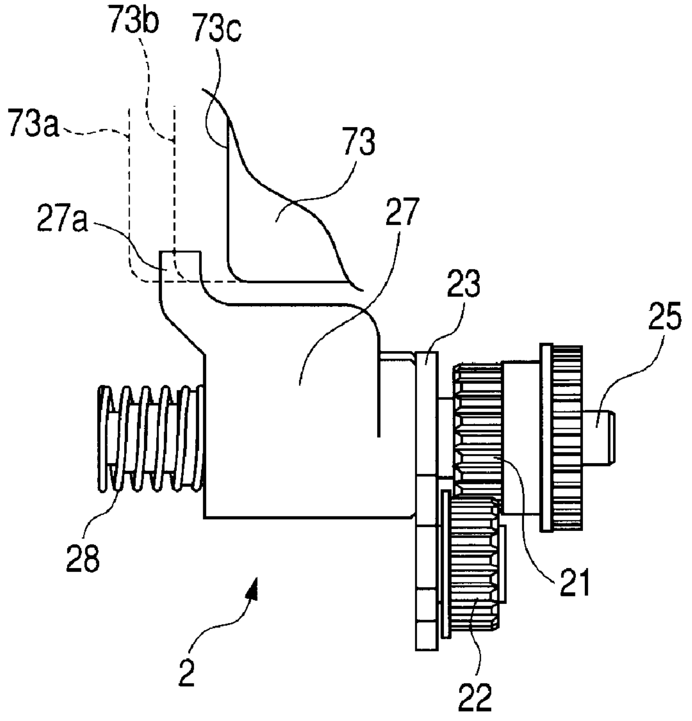
FIG. 18 is a side view illustrating a revolving restricted state of the drive transmission switching mechanism.

Next, the description of the construction of a drive transmission switching mechanism 2 will be provided with reference to FIGS. 3 to 9 and FIGS. 15 and 18. FIG. 3 is a perspective view illustrating a simplified construction of the drive transmission switching mechanism; FIG. 4 is a perspective view illustrating a neutral position of the drive transmission switching mechanism; and FIG. 5 is a perspective view illustrating a feeding position of the drive transmission switching mechanism. FIG. 6 is a perspective view illustrating a head recovery position of the drive transmission switching mechanism; and FIG. 7 is a perspective view illustrating a cassette feeding position of the drive transmission switching mechanism. FIG. 8 is a perspective view illustrating a state where a planetary arm comes into contact with a first revolving abutment rib in the drive transmission switching mechanism. FIG. 9 is a perspective view illustrating a state where the planetary arm comes into contact with a second revolving abutment rib in the drive transmission switching mechanism. FIG. 15 is a view illustrating a freely revolvable state of the drive transmission switching mechanism; and FIG. 18 is a view illustrating a revolving restricted state of the drive transmission switching mechanism.

FIGS. 3 and 4 illustrate the states where the rotational drive force of the cassette conveying motor 63 is transmitted to a sun gear 21 via a non-illustrated gear train. The sun gear 21 constitutes a planetary gear mechanism together with a planetary gear 22. The planetary gear 22 is supported by a planetary arm 23 which is a support member. The planetary arm 23 is supported so as to be freely rotatable about the center of rotation of the sun gear 21, whereby the planetary gear 22 is supported by the planetary arm 23 so as to be able to mesh with the sun gear 21 and revolve around the sun gear 21.

A shaft 25 which is the common penetration shaft is arranged at the center of rotation of the sun gear 21 and the center of rotation of the planetary arm 23, namely at the center of revolution of planetary gear 22. The sun gear 21 and the shaft 25 are constructed to be integral with each other. The planetary arm 23 is revolvably supported by the shaft 25 so as to be freely rotatable about the center of rotation of the sun gear 21. Also provided is an output clutch 26*a*, as a clutch mechanism, to which the rotational drive force of the sun gear 21 is transmitted via the shaft 25. An input clutch 26*b* as a clutch mechanism is disposed at a position opposing the output clutch 26*a*. The output clutch 26*a* has a gear shape formed with external teeth. The input clutch 26*b* is formed with internal teeth which are engaged with the external teeth of the output clutch 26*a*. The input clutch 26*b* and the planetary arm 23 are constructed to be integral with each other. The planetary arm 23, the planetary gear 22, and the input clutch 26*b* are supported so as to be slidable in the axial direction of the shaft 25, and accordingly, be slidable in the axial direction of the center of revolution of the planetary gear 22. Moreover, a compressed planetary arm spring 24 is provided between a clutch case 27 and the input clutch 26*b*, and the wall of the clutch case 27 is sandwiched between the planetary arm 23 and the planetary arm spring 24. The planetary arm spring 24 causes the planetary arm 23 to be pressure-contacted to the clutch case 27. The input clutch 26*b* and the output clutch 26*a* are disposed inside the clutch case 27. A part of the planetary arm 23 and a part of the shaft 25 are disposed inside the clutch case 27. The clutch case 27 is urged in the same direction as the axial direction of the center of revolution of the planetary gear 22 by the urging force of a clutch case spring 28.

As illustrated in FIGS. 8 and 9, a clutch case lever 27*a* is provided to be integral with the outer circumference of the clutch case 27 so as to protrude therefrom. The clutch case lever 27*a* is disposed at a position where it comes into contact with the carriage 73 when the carriage 73 as a revolving state switching unit reciprocates in the main scanning direction. The main scanning direction of the carriage 73 is identical to the axial direction of the shaft 25. When the carriage 73 presses the clutch case lever 27*a* in the rightward direction in FIG. 3 against the urging force of the clutch case spring 28, the clutch case 27 is moved along the shaft 25 together with the input clutch 26*b*. Therefore, when the carriage 73 is separated apart from the clutch case lever 27*a*, the carriage 73 does not move the clutch case 27 in the axial direction of the shaft 25. At this time, the planetary gear 22 is moved to a position where it meshes with the sun gear 21 by the action of the clutch case spring 28 and the planetary arm spring 24. In addition, the output clutch 26*a* and the input clutch 26*b* are separated apart from each other in the axial direction of the shaft 25. This state will be referred to as a revolving restricted state (see FIG. 18).

On the other hand, when the carriage 73 presses the clutch case lever 27*a* against the urging force of the clutch case spring 28, the clutch case 27 is moved in the axial direction of the shaft 25. At this time, the planetary gear 22 is positioned at a position where it is not in mesh with the sun gear 21, and the output clutch 26*a* and the input clutch 26*b* are at positions where they are engaged with each other. This state will be referred to as a freely revolvable state (see FIG. 15). In this way, by moving the planetary gear 22 in the axial direction of the center of revolution, the clutch mechanism is operated.

As illustrated in FIGS. 4 to 9, around the revolving zone of the planetary gear 22, there is arranged a plurality of drive input gears (driven gears) for transmitting the rotational drive force to the respective mechanisms. As the drive input gears, a drive input gear 40 for feeding for transmitting the rotational drive force to the feeding mechanism 4 by a drive train (not illustrated) and a drive input gear 90 for head recovery for transmitting the rotational drive force to the head recovery mechanism 9 by the drive train are provided. Also provided, as the drive input gears, is a drive input gear 50 for cassette feeding for transmitting the rotational drive force to the cassette feeding mechanism 5 by the drive train.

Further, planetary arm fixing shafts 32*b*, 32*c*, and 32*d* for restricting the revolving operation of the planetary arm 23 are provided on the rotating zone of the planetary arm 23 at respective positions where the planetary gear 22 meshes with the respective drive input gears 40, 50, and 90. Furthermore, a planetary arm fixing shaft 32*a* for restricting the rotating operation of the planetary arm 23 is provided on the rotating zone of the planetary arm 23 at a position where the planetary gear 22 does not mesh with any of the drive input gears 40, 50, and 90. The planetary arm fixing shaft 32*a* is configured to restrict the rotating operation of the planetary arm 23 in the revolving restricted state so that the planetary arm 23 is unable to rotate. A hole 23*a* is formed in the planetary arm 23 and the rotating shaft of the planetary gear 22 which is formed to be integral with the planetary arm 23, so that the pivoting operation of the planetary arm 23 is restricted when the planetary arm fixing shafts 32*a*, 32*b*, 32*c*, and 32*d* are passed through the hole 23*a*. In the freely revolvable state, the planetary arm 23 is separated apart from the planetary arm fixing shafts 32*a*, 32*b*, 32*c*, and 32*d* in the axial direction of the center of revolution. Owing to such a construction, in the freely revolvable state, the rotating operation of the planetary arm 23 is not restricted by the planetary arm fixing shafts 32*a*, 32*b*, 32*c*, and 32*d*, and therefore, the planetary gear 22 is able to revolve.

In the following descriptions, for convenience sake, the position where the planetary gear 22 meshes with the drive input gear 40 for feeding in the revolving restricted state will be referred to as a feeding position B, and the position where the planetary gear 22 meshes with the drive input gear 90 for head recovery will be referred to as a head recovery position C. Moreover, the position where the planetary gear 22 meshes with the drive input gear 50 for cassette feeding will be referred to as a cassette feeding position D, and the position where the planetary gear 22 does not mesh with any of the drive input gears 40, 50, and 90 will be referred to as a neutral position A.

In this exemplary embodiment, a construction is illustrated in which four planetary arm fixing shafts 32*a*, 32*b*, 32*c*, and 32*d* are provided so that the rotation of the planetary arm 23 is restricted at four positions A, B, C, and D. However, this exemplary embodiment is not limited to this construction and the number of positions at which the rotation of the planetary arm is restricted may be increased further as long as a sufficient space for arranging the components can be ensured. In this way, the number of mechanisms which are the drive transmission destinations to which the rotational drive force is transmitted by the drive transmission switching mechanism 2 can be increased as necessary.

Next, the description of revolving abutment ribs, as first and second abutting portions, which are brought into contact with the planetary arm 23, will be provided with reference to FIGS. 8 and 9. The revolving abutment ribs 31*a* and 31*b* come into contact with the planetary arm 23 in the freely revolvable state, thereby restricting the rotatable range of the planetary arm 23. In this exemplary embodiment, the first revolving abutment rib 31*a* comes into contact with the planetary arm 23 during the forward rotation of the cassette conveying motor 63, and the second revolving abutment rib 31*b* comes into contact with the planetary arm 23 during the reverse rotation of the cassette conveying motor 63. That is to say, the planetary arm 23 is configured to be pivotable between the first revolving abutment rib 31*a* and the second revolving abutment rib 31*b*. Further, within the pivotable range of the planetary arm 23, defined by the first revolving abutment rib 31*a* and the second revolving abutment rib 31*b*, the neutral position A, the feeding position B, the head recovery position C, and the cassette feeding position D are arranged in this order. The drive transmission switching mechanism 2 is controlled by a control circuit 100 (FIG. 10) so that the planetary arm 23 comes into contact with the revolving abutment rib disposed closer to the drive input gear transmitting the drive force among the first and second revolving abutment ribs 31*a* and 31*b*.

When the revolving state transitions from the freely revolvable state to the revolving restricted state in a state where the planetary arm 23 is in contact with the first revolving abutment rib 31*a*, the planetary arm 23 is fixed at the neutral position A. Similarly, when the revolving state transitions from the freely revolvable state to the revolving restricted state in a state where the planetary arm 23 is in contact with the second revolving abutment rib 31*b*, the planetary arm 23 is fixed at the cassette feeding position D.

Figure 10:
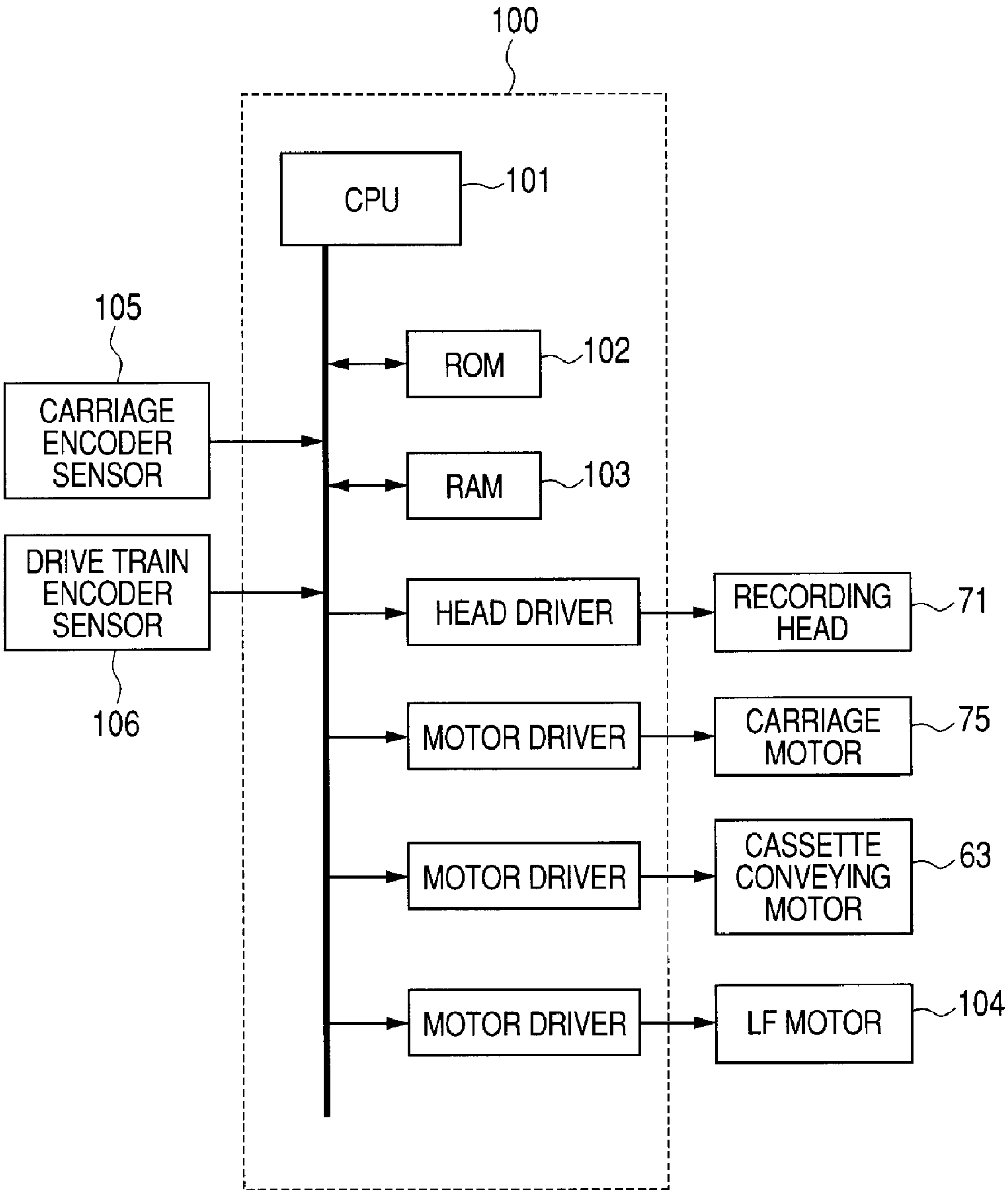
FIG. 10 is a block diagram of a control circuit of the ink jet recording apparatus.
Figure 11:
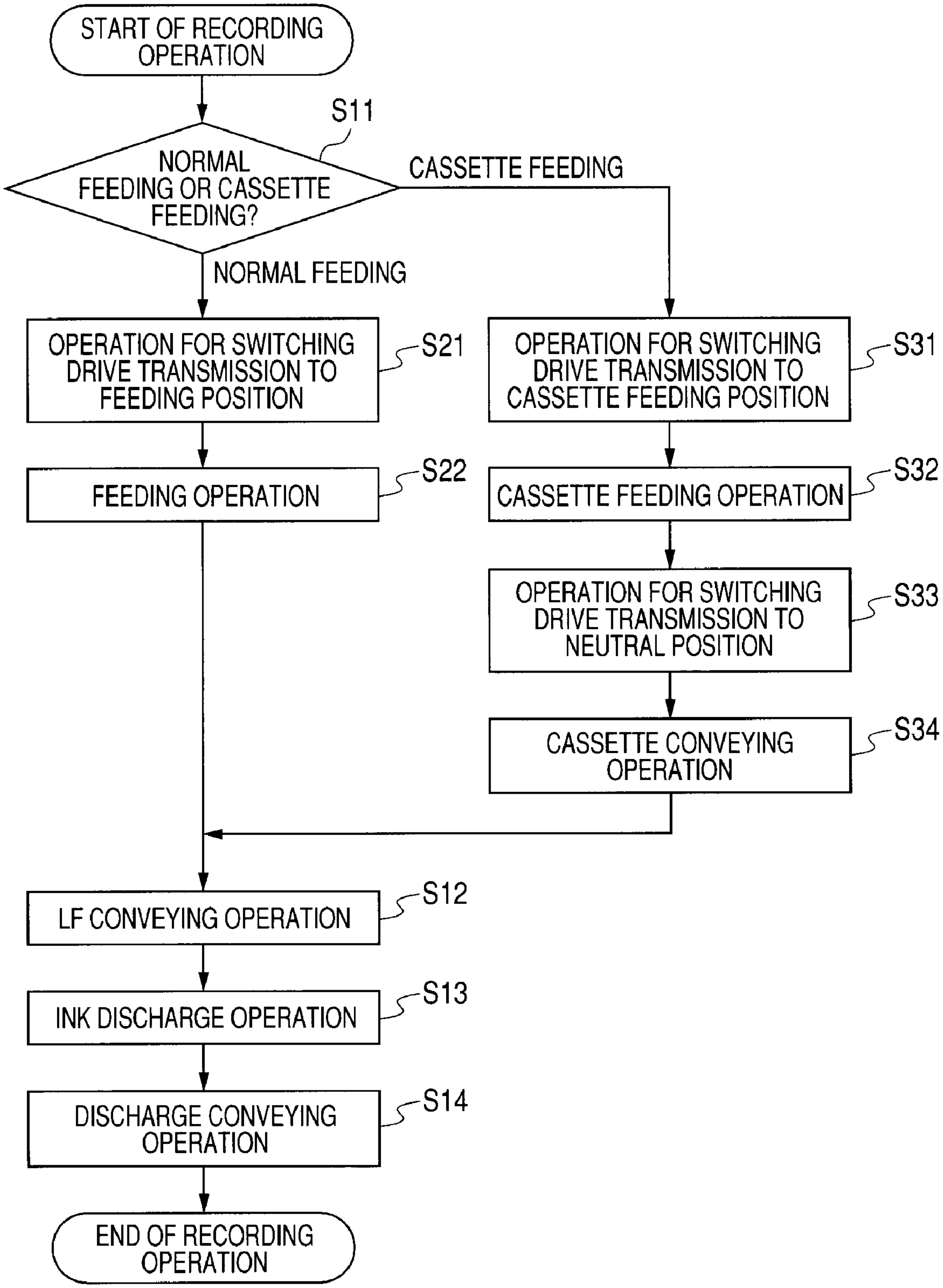
FIG. 11 is a flowchart for describing a recording operation of the ink jet recording apparatus.

Next, the description of the control for a series of recording operations according to the first exemplary embodiment will be provided with reference to FIGS. 10 and 11. FIG. 10 is a block diagram of a control circuit, and FIG. 11 is a flowchart for describing the recording operation.

In FIG. 10, a control circuit 100 of a recording apparatus is configured to include a CPU 101 responsible for controlling the recording apparatus, a ROM 102 storing therein programs, various tables, and data such as integers, and a RAM 103 for temporarily storing information. The control circuit 100 is also provided with a head driver for driving the recording head 71 and drivers for driving the carriage motor 75, the cassette conveying motor 63, and the LF motor 104.

An encoder sensor 105 is capable of detecting the position of the carriage. An encoder sensor 106 is capable of detecting the amount of rotation of the cassette conveying motor 63. The encoder sensor 106 may be configured to directly detect the amount of rotation at the output shaft of the cassette conveying motor 63 and may be configured to indirectly detect the amount of rotation by detecting the amount of rotation of an intermediate gear transmitting the drive force from the cassette conveying motor 63 to the sun gear 21.

In FIG. 11, when the recording operation is started, a determination is first made as to whether normal feeding or cassette feeding is selected (step S11). When the normal feeding is instructed, an operation for switching drive transmission to the feeding position is executed (step S21), whereas when the cassette feeding is instructed, an operation for switching drive transmission to the cassette feeding position is executed (step S31). The detailed description of the drive transmission switching operation will be provided later. With this operation, the rotational drive force of the cassette conveying motor 63 can be transmitted to the feeding mechanism 4 or the cassette feeding mechanism 5 via the drive transmission switching mechanism 2 and a non-illustrated drive train.

First, the case of receiving the normal feeding instruction will be described. The feeding mechanism 4 transmits the rotational drive force of the cassette conveying motor 63 to the feeding roller 44. Then, a feeding operation is performed by separating one sheet from a bundle of the sheets 42 stacked in the feeding opening 41 using the pressure plate 43 and the separation roller 45. Then, the feeding mechanism 4 conveys the separated one sheet 42 to a nip portion between the LF roller 78 and the LF pinch roller 79 through a part of the cassette conveying sheet path 64, thereby completing the feeding operation (step S22).

Next, the case of receiving the cassette feeding instruction will be described. The cassette feeding mechanism 5 transmits the rotational drive force of the cassette conveying motor 63 to the cassette feeding roller 52 via a non-illustrated drive train. Then, a cassette feeding operation is performed by separating one sheet from the bundle of sheets 42 stacked on the cassette 51 using the cassette 51, the cassette feeding roller 52, and the cassette separation portion 53. Then, the cassette feeding mechanism 5 conveys the separated one sheet 42 to a nip portion between the cassette conveying roller 61 and the cassette conveying pinch roller 62 through the cassette conveying sheet path 64, thereby completing the cassette feeding operation (step S32).

The cassette feeding roller 52 does not need to be driven after the front end of the sheet 42 has reached the nip portion between the cassette conveying roller 61 and the cassette conveying pinch roller 62. This is because the next sheet 42 might be uselessly fed if the cassette feeding roller 52 is driven continuously. Therefore, when the cassette feeding operation is completed, the planetary gear 22 is switched to the neutral position A (step S33).

Thereafter, the front end of the sheet 42 is moved to a nip portion between the LF roller 78 and the LF pinch roller 79 through the cassette conveying sheet path 64 by the drive of the cassette conveying roller 61 (step S34).

After this point of time, the operations for the normal feeding and the cassette feeding follow the same procedures. The LF roller 78 is rotated by the rotation of the LF motor 104. The LF pinch roller 79 is rotated so as to follow the rotation of the LF roller 78 by the urging force of a non-illustrated LF pinch roller spring. When the sheet 42 reaches the nip portion between the LF roller 78 and the LF pinch roller 79, the front end of the sheet 42 is inserted into the nip portion so that the sheet 42 is pinched between the LF roller 78 and the LF pinch roller 79, whereby the conveying of the sheet 42 is started. The LF roller 78 conveys the sheet 42 until the front end of the sheet 42 is moved to be positioned between the recording head 71 and the platen 77 (step S12).

Next, a recording operation is performed by discharging ink to the sheet 42 while sequentially repeating the main scanning drive of the carriage 73 and the sheet conveying drive of the LF roller 78 (step S13).

When the ink discharge for image formation in accordance with recording instructions is completed, the sheet 42 is pinched by the discharge roller 81 and the spur 82 to be conveyed to the discharge tray 83 outside the ink jet recording apparatus 1, thereby performing a discharge operation (step S14).

The above description is of the control (procedures) for a series of recording operations. On the other hand, when it is necessary to perform a head recovery operation before, during, or after recording in order to maintain a normal ink discharge state of the recording head 71, an operation for switching drive transmission to the head recovery position C is performed. The detailed description of the drive transmission switching operation will be provided later. Thereafter, the rotational drive force of the cassette conveying motor 63 is transmitted to the head recovery mechanism 9, and the head recovery operation is performed using the cap 91, the suction pump 92, and the wiper 93.

Figure 12:
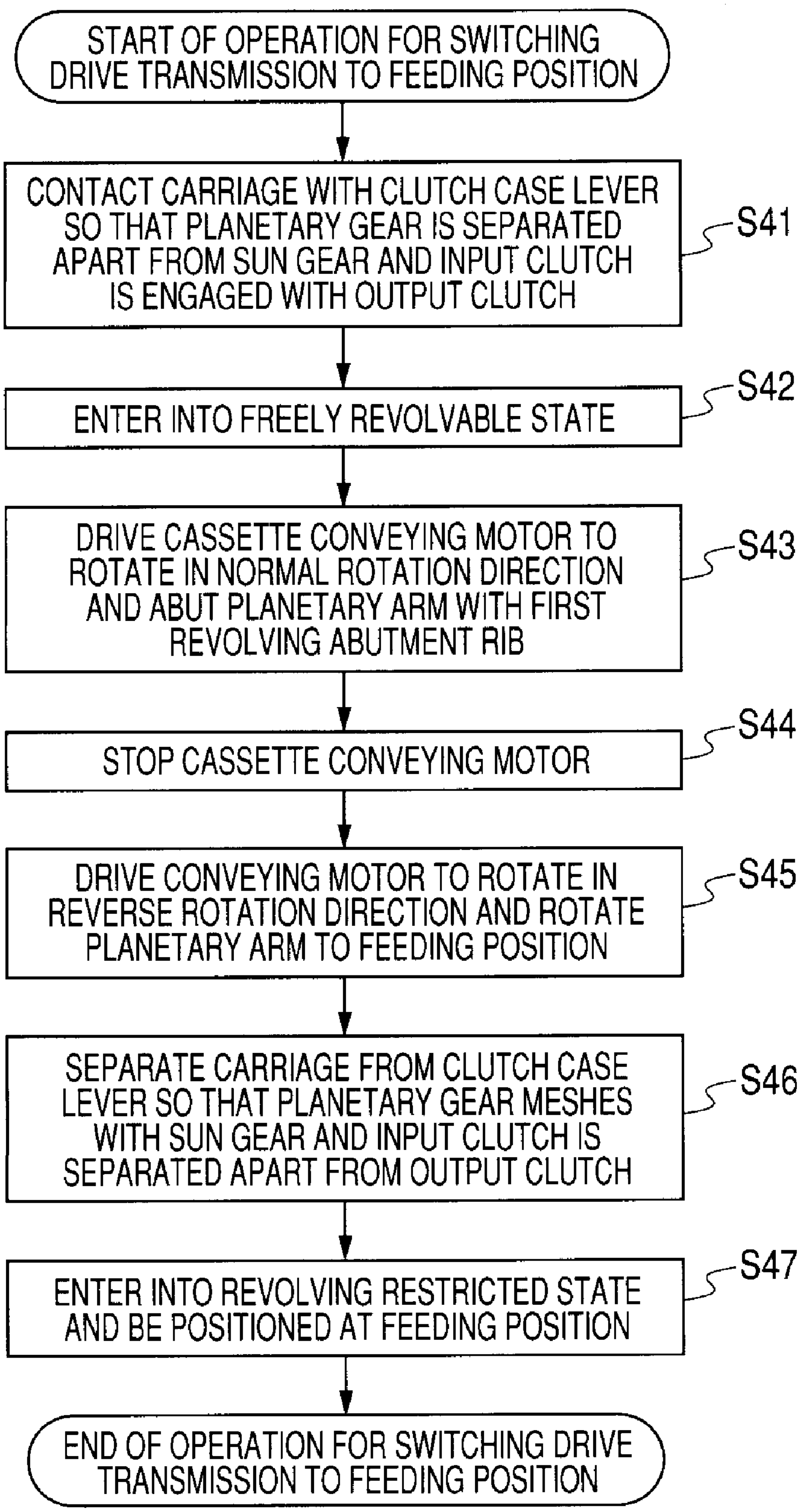
FIG. 12 is a flowchart for describing an operation for switching drive transmission to the feeding position according to a first exemplary embodiment.
Figure 13:
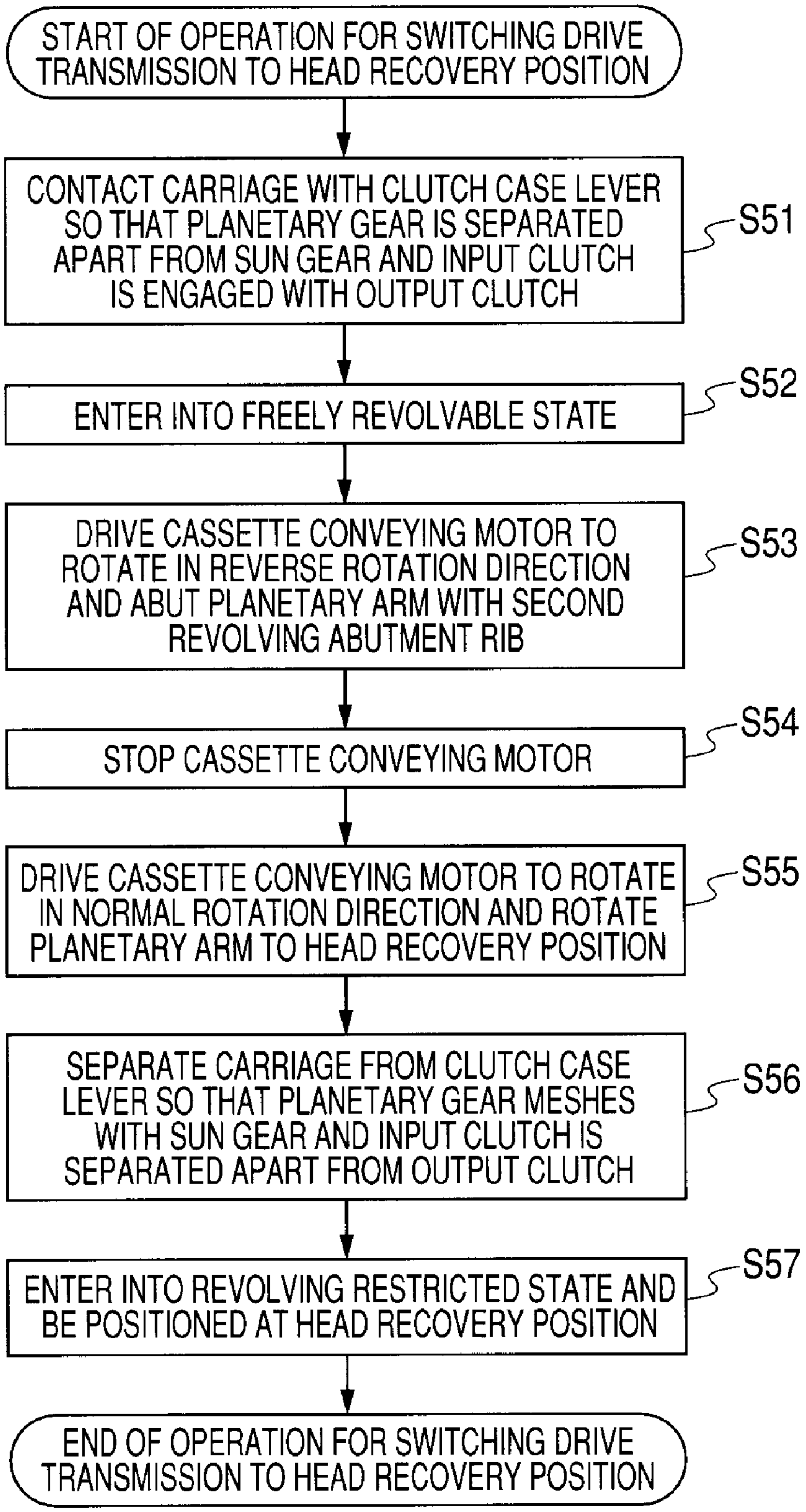
FIG. 13 is a flowchart for describing an operation for switching drive transmission to the head recovery position according to the first exemplary embodiment.

Next, the detailed description of the drive transmission switching operation will be provided with reference to FIGS. 12 and 13. FIG. 12 is a flowchart for describing the operation for switching drive transmission to the feeding position according to the first exemplary embodiment; and FIG. 13 is a flowchart for describing the operation for switching drive transmission to the head recovery position according to the first exemplary embodiment.

Upon receiving an instruction to perform the operation for switching drive transmission to the feeding position B, the carriage motor 75 is first driven to move the carriage 73 over the head recovery mechanism 9 to the vicinity of the drive transmission switching mechanism 2. The carriage 73 is continuously moved, so that the carriage 73 comes into contact with the clutch case lever 27*a*. The carriage 73 is moved further, so that the clutch case 27 is slid in the axial direction of the center of revolution against the urging force of the clutch case spring 28. With the sliding movement of the clutch case 27, the planetary gear 22, the planetary arm 23, and the input clutch 26*b* are slid by the urging force of the planetary arm spring 24. The carriage motor 75 is driven until the carriage encoder sensor 105 detects that the carriage 73 has been moved to the position indicated by 73*a* in FIG. 15.

When the planetary gear 22 is moved to the position illustrated in FIG. 15, the planetary gear is separated apart from the sun gear 21, and the output clutch 26*a* is engaged with the input clutch 26*b* (step S41). This state will be referred to as a freely revolvable state.

In the freely revolvable state, when the cassette conveying motor 63 is driven to rotate the sun gear 21, the output clutch 26*a* and the input clutch 26*b* are rotated via the shaft 25, so that the planetary gear 22 and the planetary arm 23 can be rotated (step S42).

In the freely revolvable state, the cassette conveying motor 63 is rotated in the forward rotation direction. Then, the planetary arm 23 comes into contact with the first revolving abutment rib 31*a* with the rotational movement, as illustrated in FIG. 8 (step S43).

When the planetary arm 23 comes into contact with the first revolving abutment rib 31*a*, the cassette conveying motor 63 becomes unable to be rotated in the forward rotation direction. When the drive train encoder sensor 106 detects that the planetary arm 23 has come into contact with the first revolving abutment rib 31*a* and the cassette conveying motor 63 has stopped, the cassette conveying motor 63 is stopped. This operation is the operation of initializing the rotating position of the planetary arm 23, namely the revolving position of the planetary gear 22, by the first revolving abutment rib 31*a* (step S44).

Next, the cassette conveying motor 63 is rotated by a predetermined amount in the reverse rotation direction while monitoring the drive train encoder sensor 106. The predetermined amount is the amount of rotation which is calculated from the rotation angle required for the planetary arm 23 to reach the feeding position B from the first revolving abutment rib 31*a* (step S45).

Subsequently, the carriage 73 which is pressing the clutch case lever 27*a* is moved to the original position. Then, the clutch case 27 is returned to the original position by the urging force of the clutch case spring 28. Moreover, the planetary gear 22, the planetary arm 23, and the input clutch 26*b* are also returned to their respective original positions by the urging force of the planetary arm spring 24. At this time, the planetary gear 22 meshes with the sun gear 21 and the drive input gear 40 for feeding, and the output clutch 26*a* and the input clutch 26*b* are separated apart from each other (step S46). This state will be referred to as a revolving restricted state (step S47).

The above description is of the operation for switching drive transmission to the feeding position B. Next, the description of the operation for switching drive transmission to the neutral position A will be provided.

Since the operation for switching drive transmission to the neutral position A is substantially the same as the operation for switching drive transmission to the feeding position B, only the different operation will be described.

By changing the amount of rotation when rotating the cassette conveying motor 63 in the reverse rotation direction in step S45, the planetary arm 23 is rotated to be moved to the neutral position A. The operations other than the operation of step S45 are the same as those of the operation for switching drive transmission to the feeding position B. As described above in the first exemplary embodiment, since the neutral position A and the first revolving abutment rib 31*a* are in the same positional relationship, in fact, even the operation of step S45 may be omitted.

Next, the description of the operation for switching drive transmission to the head recovery position C will be provided with reference to FIG. 13. The operation for switching drive transmission to the head recovery position C is substantially the same as the operation for switching drive transmission to the feeding position B, and the only difference lies in the fact that the rotation direction and the amount of rotation of the cassette conveying motor 63 are changed. Only the different operation from the operation for switching drive transmission to the feeding position B will be described below.

Although the cassette conveying motor 63 was rotated in the forward rotation direction in step S43, the cassette conveying motor 63 is rotated in the reverse rotation direction in step S53. In step S53, when the drive train encoder sensor 106 detects that the planetary arm 23 comes into contact with the second revolving abutment rib 31*b* and the cassette conveying motor 63 has stopped, the cassette conveying motor 63 is stopped. This operation is the operation of initializing the rotating position of the planetary arm 23, namely the revolving position of the planetary gear 22, by the second revolving abutment rib 31*b*.

Although the cassette conveying motor 63 was rotated by a predetermined amount in the reverse rotation direction in step S45, the cassette conveying motor 63 is rotated by a predetermined amount in the forward rotation direction in step S55. The predetermined amount is the amount of rotation which is calculated from the rotation angle required for the planetary arm 23 to reach the head recovery position C from the second revolving abutment rib 31*b*.

The above is the difference between the operation for switching drive transmission to the feeding position B and the operation for switching drive transmission to the head recovery position C, which lies in the rotation direction and the amount of rotation of the cassette conveying motor 63. Next, the description of the operation for switching drive transmission to the cassette feeding position D will be provided. The operation for switching drive transmission to the cassette feeding position D is substantially the same as the operation for switching drive transmission to the head recovery position C, and only the different operation will be described.

By changing the amount of rotation when rotating the cassette conveying motor 63 in the forward rotation direction in step S55, the planetary arm 23 is rotated to be moved to the cassette feeding position D. The operations other than the operation of step S55 are the same as those of the operation for switching drive transmission to the head recovery position C. As described above, since the cassette feeding position D is identical to the position where the planetary arm 23 is moved to come into contact with the second revolving abutment rib 31*b*, in fact, even the operation of step S55 may be omitted.

As described above, when performing the operation for switching drive transmission to the neutral position A or the feeding position B, the planetary arm 23 is moved to come into contact with the first revolving abutment rib 31*a*, thereby initializing the rotating position of the planetary arm 23. On the other hand, when performing the operation for switching drive transmission to the head recovery position C or the cassette feeding position B, the planetary arm 23 is moved to come into contact with the second revolving abutment rib 31*b*, thereby initializing the rotating position of the planetary arm 23.

Referring to FIG. 5, the arrow 34*a* illustrates the moving trajectory of the planetary arm 23 when the rotating position of the planetary arm 23 was initialized using only the first revolving abutment rib 31*a* during the operation for switching drive transmission from the feeding position B to the cassette feeding position D. On the other hand, the arrow 34*b* illustrates the moving trajectory when the initialization was carried out using the second revolving abutment rib 31*b*. Comparing the movement amounts indicated by the arrows 34*a* and 34*b* with each other, the movement amount indicated by the arrow 34*a* results in the rotational movement corresponding to four positions, whereas the movement amount indicated by the arrow 34*b* results in the rotational movement corresponding to only two positions. Similarly, the arrows 35*a* and 35*b* in FIG. 6 indicate the respective movement amounts. Comparing the respective movement amounts with each other, it can be understood that in the operation for switching drive transmission from the head recovery position C to the neutral position A, the rotational movement can be suppressed to the minimum by causing the planetary arm 23 to come into contact with the first revolving abutment rib 31*a*.

As can be seen from the above, by performing the drive transmission switching operation using the second revolving abutment rib 31*b*, the amount of drive required for rotating the planetary arm 23 in the drive transmission switching operation can be decreased compared with the drive transmission switching operation using only the first revolving abutment rib 31*a*. Moreover, by performing the drive transmission switching operation using the second revolving abutment rib 31*b*, the drive transmission switching operation can be simplified and the time taken to complete the drive transmission switching operation can be reduced.

As described in steps S43 and S53, the contact state of the planetary arm 23 during its rotational movement is detected based on the stopping of the cassette conveying motor 63 which is the drive source. Owing to such a construction, the rotating position of the planetary arm 23 can be detected accurately, and accordingly, it is not necessary to prepare an additional sensor for detecting the rotating position of the planetary arm 23. Moreover, a series of drive transmission switching operations can be performed by detecting the drive amount of the cassette conveying motor 63 and the stopping of the cassette conveying motor 63 in the contact state.

If the position of the planetary gear 22 before performing the drive transmission switching operation is definite, the time taken to complete the drive transmission switching operation can be further reduced by operating in the following manner. In the case of performing the operation for switching drive transmission from the neutral position A to the head recovery position C, the second revolving abutment rib 31*b* is located closer to the head recovery position C, which is the destination position, than the first revolving abutment rib 31*a*. However, in this case, the time can be reduced by performing the initialization of the rotating position of the planetary arm 23 using the first revolving abutment rib 31*a*.

As indicated by the arrow 33*a* in FIG. 4, the planetary arm 23 is required to perform the rotational movement corresponding to four positions when the initialization was performed by causing the planetary arm 23 to come into contact with the second revolving abutment rib 31*b*. On the other hand, as indicated by the arrow 33*b*, the planetary arm 23 is required to perform the rotational movement corresponding to only two positions when the initialization was performed by causing the planetary arm 23 to come into contact with the first revolving abutment rib 31*a*. Moreover, as indicated by the arrows 36*a* and 36*b* in FIG. 7, the time can be reduced similarly in the case of performing the operation for switching drive transmission from the cassette feeding position D to the feeding position B. That is to say, in this case, the amount of the rotational movement of the planetary arm 23 can be reduced by causing the planetary arm 23 to come into contact with the second revolving abutment rib 31*b*.

In addition, the planetary arm 23 is rotated in both the forward rotation direction and the reverse rotation direction while maintaining the freely revolvable state of the planetary arm 23. That is to say, the operation of rotating the planetary arm 23 in the forward rotation direction to come into contact with the first revolving abutment rib 31*a* and the operation of rotating the planetary arm 23 in the reverse rotation direction to come into contact with the second revolving abutment rib 31*b* are performed successively.

As described above, the drive transmission switching mechanism 2 is controlled by the control circuit 100 to cause the planetary arm 23 to successively come into contact with the first and second revolving abutment ribs 31*a* and 31*b*. The control circuit 100 detects the rotation angle of the planetary arm 23 rotating from the first revolving abutment rib 31*a* to the second revolving abutment rib 31*b* by using the drive train encoder sensor 106. Then, the rotation angle detected by the drive train encoder sensor 106 is compared with the rotation angle required for the rotational movement which is determined by the component arrangement design and stored in the ROM. Based on the comparison results, a determination can be made as to whether the drive transmission switching mechanism 2 is properly operating, whether the two revolving abutment ribs 31*a* and 31*b* are properly functioning, and whether the carriage 73 is properly driven.

As described above, in this exemplary embodiment, the first and second revolving abutment ribs 31*a* and 31*b* are provided in order to initialize the revolving position of the planetary gear 22, and the ribs 31*a* and 31*b* are selectively used for making contact with the planetary arm 23. Specifically, the planetary arm 23 can be pivoted by two kinds of operations, one operation wherein the planetary arm 23 is first moved from the present position to come into contact with the first revolving abutment rib 31*a* and is then pivoted to the destination position, the other operation wherein the planetary arm 23 is first moved to come into contact with the second revolving abutment rib 31*b* and is then pivoted to the destination position. The control circuit 100 selects and executes one of the above-mentioned operations in order to move the planetary arm 23 to be pivoted from the present position to the destination position so that the selected operation requires the planetary arm 23 to be pivoted by the smaller amount. By controlling in such a manner, the time taken for the drive transmission switching mechanism 2 to complete the drive transmission switching operation can be reduced, and the reliability of the drive transmission switching mechanism 2 can be improved.

Second Exemplary Embodiment

Figure 14:
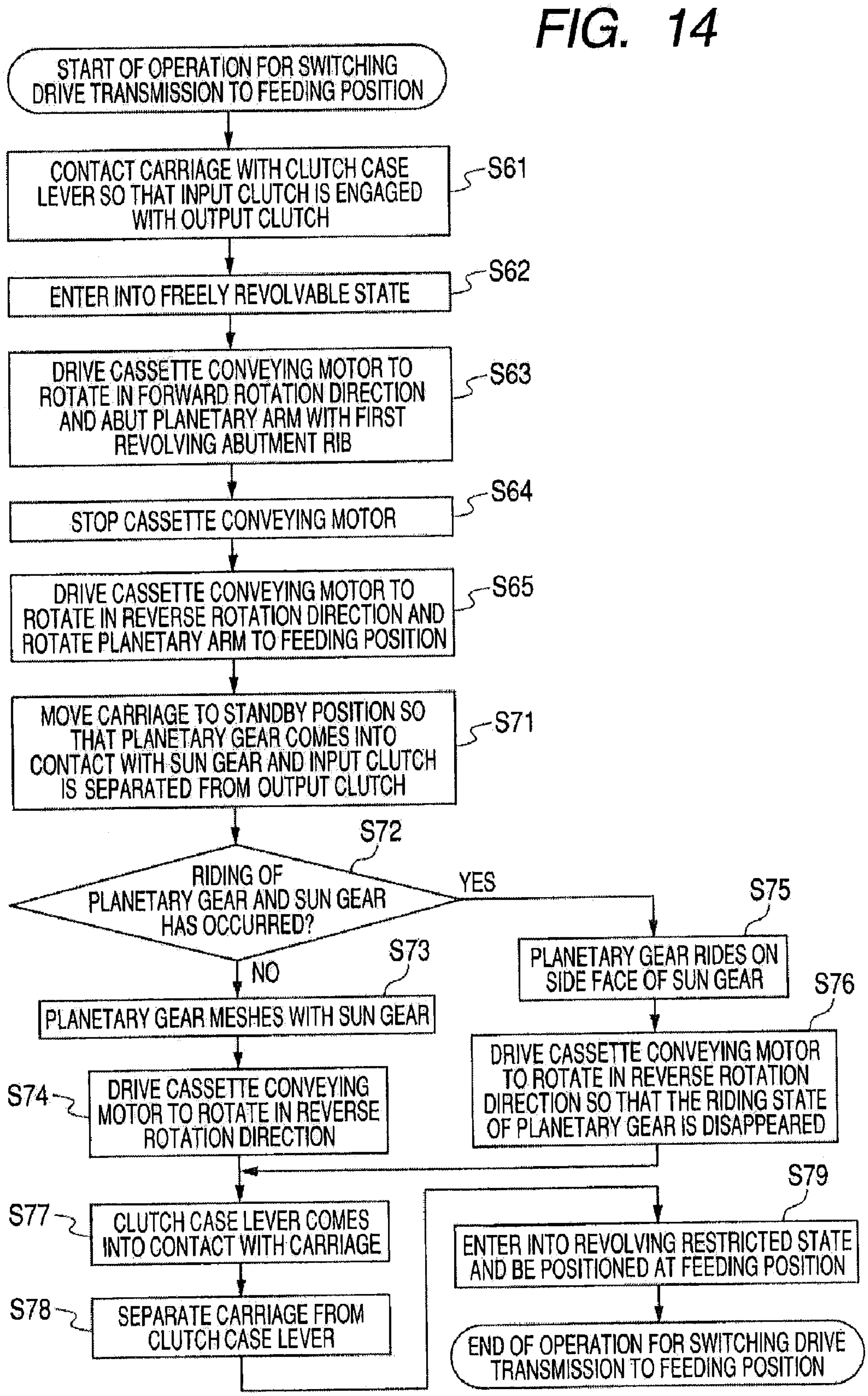
FIG. 14 is a flowchart for describing the operation for switching drive transmission to the feeding position according to a second exemplary embodiment.
Figure 17:
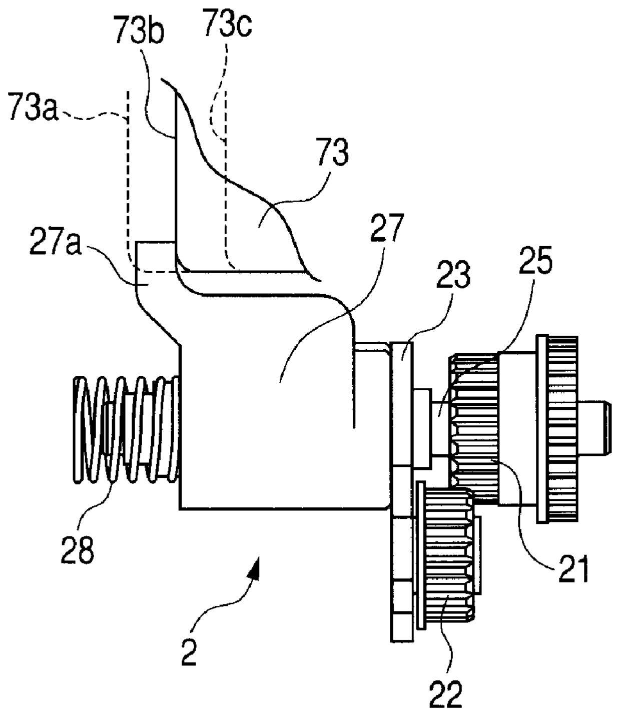
FIG. 17 is a top plan view illustrating a state where the riding state of the planetary gear on the sun gear is eliminated in the drive transmission switching mechanism.

Next, the description of the second exemplary embodiment will be provided with reference to FIGS. 14 and 17. FIG. 14 is a flowchart for describing the operation for switching drive transmission to the feeding position B according to the second exemplary embodiment; and FIG. 17 is a view illustrating a state where the riding state of the planetary gear 22 is eliminated in the drive transmission switching mechanism 2.

The construction of the ink jet recording apparatus 1 and the drive transmission switching mechanism 2 is the same as the construction of the first exemplary embodiment. The operations in steps S41 to S45 illustrated in FIG. 12 are the same as those of steps S61 to S65 illustrated in FIG. 14. The difference between the first exemplary embodiment and the second exemplary embodiment lies in the operations in steps S71 to S79 in FIG. 14; therefore, only the different operations will be described and the descriptions of the same operations will be omitted.

Figure 16:
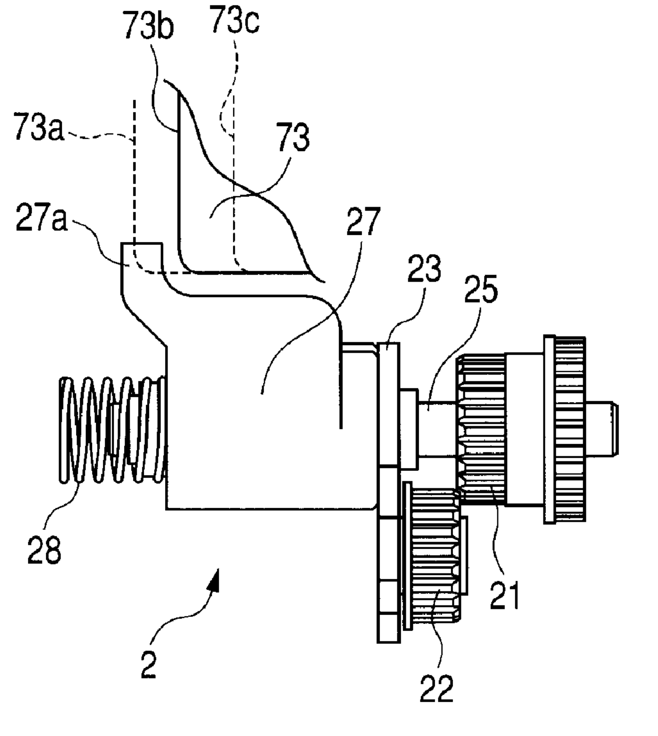
FIG. 16 is a top plan view illustrating a state where the planetary gear rides on a sun gear in the drive transmission switching mechanism.

As illustrated in step S71 of FIG. 14, the carriage 73 is first moved to a standby position. The standby position is located between the first position 73*a* of the carriage 73 in the freely revolvable state as illustrated in FIG. 15 and the second position 73*c* of the carriage 73 in the revolving restricted state as illustrated in FIG. 18 and corresponds to the third position 73*b* as illustrated in FIGS. 16 and 17. The state where the carriage 73 is positioned at the third position 73*b* will be referred to as a revolving standby state. As illustrated in FIG. 17, when the carriage 73 is positioned at the standby position 73*b*, the movement of the clutch case lever 27*a* is restricted in a state where the planetary gear 22 and the sun gear 21 are unable to perfectly mesh with each other but partially mesh in the thickness direction of the gears.

The carriage 73 functions as the revolving state switching unit as described above, and the clutch case lever 27*a* is urged to a position where it comes into contact with the carriage 73 by the urging force of the clutch case spring 28. At this time, the planetary gear 22 is slid in the axial direction to come into contact with the sun gear 21, and the output clutch 26*a* and the input clutch 26*b* are separated apart from each other and are unable to receive the rotational drive force (step S71).

Two states may occur as a result of the operation in step S71. As described above, if the planetary gear 22 was able to mesh with the sun gear 21 by the sliding movement in the axial direction in step S71, the clutch case lever 27*a* will follow the movement of the carriage 73 as illustrated in FIG.

17. At this time, the urging force of the clutch case spring 28 causes the clutch case lever 27*a* to come into contact with the abutting portion of the carriage 73, which is a moving member (step S73).

If the planetary gear 22 is unable to mesh with the sun gear 21 but the side faces of the teeth of the planetary gear 22 are in mesh with the side faces of the teeth of the sun gear 21 in step S71, the clutch case lever 27*a* stops without following the movement of the carriage 73 as illustrated in FIG. 16. Then, the clutch case lever 27*a* is separated apart from the abutting portions of the carriage 73. At this time, the urging force of the clutch case spring 28 is applied to the abutting portions of the sloped side faces of the respective teeth of the planetary gear 22 and the sun gear 21. Since the frictional resistance between the sloped faces is sufficiently large, the urging force and the frictional force are in an equilibrium state (step S75).

Figure 19:
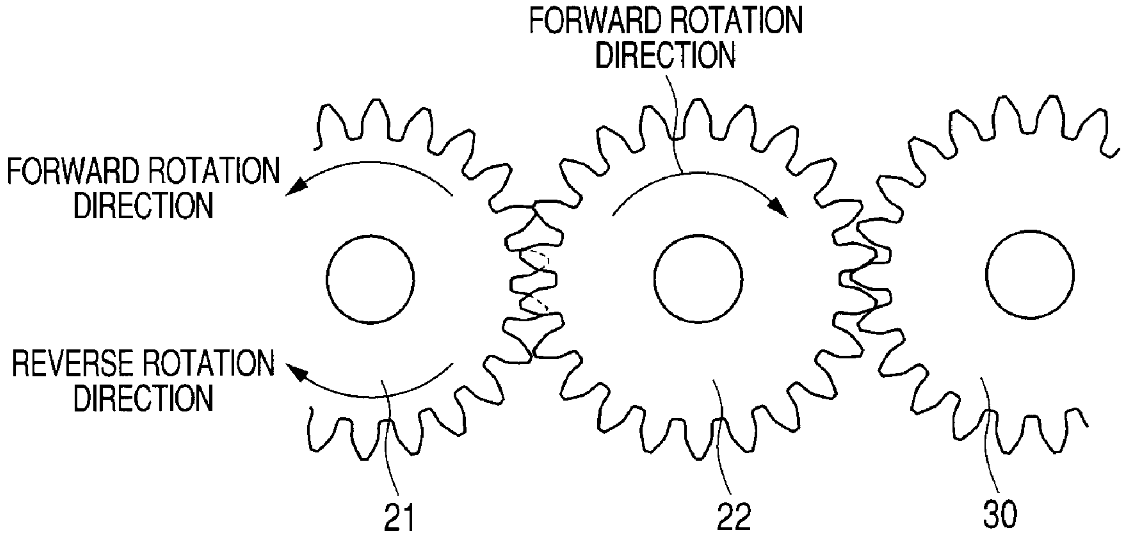
FIG. 19 is a schematic view illustrating the state where the planetary gear rides on the sun gear.

In the state where the planetary gear 22 rides on the sun gear 21, the backlash in the drive train extending from the cassette conveying motor 63 to the sun gear 21, the planetary gear 22, the drive input gear 30, and respective mechanisms of the drive transmission destinations is zero as illustrated in FIG. 19. This is because the planetary gear 22 may have a rotational backlash if the backlash is not zero, and accordingly, the interference of the teeth during its sliding movement in the axial direction might be eliminated by the rotational backlash. The state where the planetary gear 22 rides on the sun gear 21 so that the backlash becomes zero may occur in a case where the drive train is blocked in the forward rotation direction and the backlash becomes zero and a case where the drive train is blocked in the reverse rotation direction and the backlash becomes zero. FIG. 19 illustrates the state where the drive train is blocked in the forward rotation direction.

Subsequent to step S75, the cassette conveying motor 63 is rotated in the reverse rotation direction (step S76). The reason for rotating the cassette conveying motor 63 in the reverse rotation direction at this time is as follows. In order to perform the feeding operation after the operation for switching drive transmission to the feeding position B is completed, the cassette conveying motor 63 is rotated in the forward rotation direction so that the feeding roller is rotated. At this time, when the planetary gear 22 is riding on the sun gear 21 in the state of being blocked in the reverse rotation direction, a rotational backlash will occur in the drive train because of the rotational drive in the forward rotation direction during the subsequent feeding operation. Therefore, the interference between the teeth of the planetary gear 22 is eliminated, and the planetary gear 22 is slid in the axial direction to mesh with the sun gear 21.

On the other hand, as illustrated in FIG. 19, when the planetary gear 22 is riding on the sun gear 21 in the state of being blocked in the forward rotation direction, the interference between the teeth would not be eliminated by the rotational drive in the forward rotation direction during the subsequent feeding operation. This is because the riding state of the planetary gear 22 on the sun gear 21 results from the contact between the sloped side faces of the teeth. Therefore, even when the rotational drive in the forward rotation direction was carried out in such a state, the drive input gear 30 may be rotated in the state where the planetary gear 22 is riding on the sun gear 21. Otherwise, the planetary gear 22 may ride on the sloped side faces of the teeth against the urging force of the clutch case spring 28, whereby the planetary gear 22 may be pushed back in the axial direction of the center of revolution. That is to say, when the rotational drive in the forward rotation direction is carried out in such a state, any of the above-mentioned states may occur.

Figure 20:
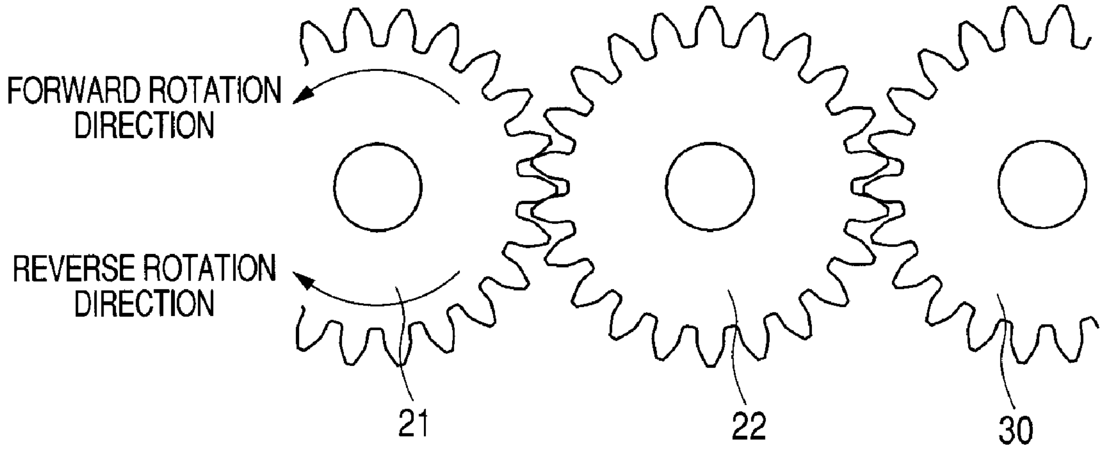
FIG. 20 is a schematic view illustrating the state where the riding state of the planetary gear on the sun gear is eliminated.

Since the rotational drive during the feeding operation which is performed after the drive transmission switching operation is completed is carried out in the forward rotation direction, the rotational drive in step S76 during the drive transmission switching operation is set to the reverse rotation direction. By operating in such a manner, when the planetary gear 22 is blocked in the forward rotation direction so that the backlash is zero, a rotational backlash occurs in the planetary gear 22 by the rotational drive in the reverse rotation direction which is performed during the drive transmission switching operation. Therefore, as illustrated in FIG. 20, the interference between the teeth when the planetary gear 22 is slid in the axial direction can be eliminated. The optimum amount of rotational drive necessary for eliminating the interference is at least a half of one gear tooth. This is because the interference between the teeth might not occur at an angle corresponding to the half of one gear tooth or more.

On the other hand, when the planetary gear 22 is blocked in the reverse rotation direction so that the backlash becomes zero, since the feeding operation which is performed after the drive transmission switching operation is completed is carried out by the rotational drive in the forward rotation direction, the interference between the teeth of the planetary gear 22 can be eliminated by the rotational drive in the forward rotation direction. Moreover, in this case, since the amount of the rotational drive in the forward rotation direction corresponds to a half of one gear tooth, it has no influence on the drive train at the rear stage or the mechanisms of the drive transmission destinations, to which the rotational drive force of the drive input gear is transmitted (step S74).

Moreover, in a state where the planetary gear 22 is riding on the side faces of the sun gear 21 as illustrated in step S75, the clutch case lever 27*a* and the carriage 73 are separated apart from each other, as illustrated in FIG. 16. Thereafter, when the riding state of the planetary gear 22 on the sun gear 21 is eliminated in step S76, the clutch case lever 27*a* comes into contact with the abutting portions of the carriage 73 by the urging force of the clutch case spring 28 as illustrated in FIG. 17. At this time, although the clutch case 27 and the planetary gear 22 are accelerated by the urging force of the clutch case spring 28, since the carriage 73 is positioned at the standby position 73*b*, the moving distance is sufficiently short. Therefore, the clutch case 27 will collide with the carriage 73 before being accelerated to high speed, so that the colliding noise can be reduced. Moreover, since the carriage 73 is stopped at the standby position by the carriage belt 76 which is an elastic member, even when the accelerated clutch case lever 27*a* collides with the carriage 73, the colliding impact can be absorbed by the carriage belt 76, thereby reducing the colliding noise. On the other hand, when the planetary arm 23 which is a relatively hard material is made to collide with the sun gear 21 as illustrated in FIG. 18, relatively large colliding noise may be easily generated since both of them are hard materials.

As described above, the rotation direction of the rotational drive which is performed during the drive transmission switching operation is opposite to the rotation direction of the rotational drive which is performed after the drive transmission switching operation is completed. Moreover, the amount of the rotational drive in the reverse rotation direction is set to a half of one gear tooth of the planetary gear 22. By doing so, the influence on the drive transmission destination can be suppressed as much as possible, and the riding state of the planetary gear 22 on the sun gear 21 can be eliminated with certainty. Moreover, as illustrated in FIGS. 16 and 17, since the drive transmission switching mechanism 2 is caught against the carriage 73 positioned at the standby position, generation of colliding noise can be prevented.

As described above, according to this exemplary embodiment, the sun gear 21 is rotated by a very small amount during the drive transmission switching operation, and is then rotated in the direction opposite to the rotation direction of the drive which is performed after the drive transmission switching operation is completed. Therefore, the planetary gear 22 and the sun gear 21 can be in perfect mesh with each other, and the drive transmission switching mechanism 2 moving with the drive transmission switching operation can be caught against the carriage 73. Therefore, according to this exemplary embodiment, a quiet drive transmission switching operation of the drive transmission switching mechanism 2 and an improvement in the reliability of the drive transmission switching operation can be achieved.

In step S72 of the flowchart of FIG. 14, it is determined whether or not the planetary gear 22 rides on the sun gear 21. The riding state may be actually detected by using a sensor, and the cassette conveying motor 63 may be controlled differently depending on the detection results. For example, step S74 may be omitted if the riding state has not occurred.

Figure 21:
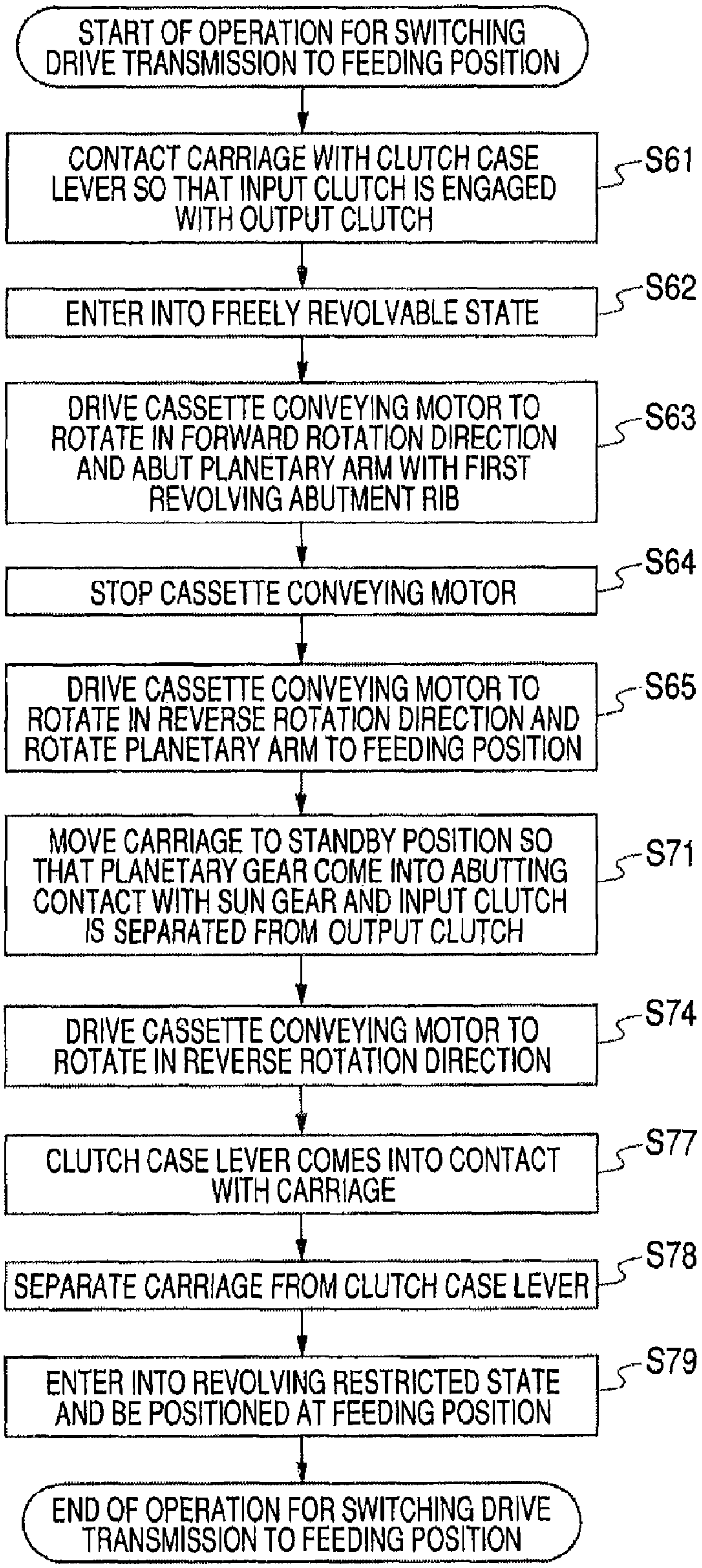
FIG. 21 is a flow chart showing that the cassette conveying motor is driven in the reverse rotation direction in any cases without detecting or determining whether the planetary gear is riding on the sun gear.

In step S74 of the flowchart illustrated in FIG. 21, the cassette conveying motor 63 is driven in the reverse rotation direction in any cases without detecting or determining whether the planetary gear 22 is riding on the sun gear 21. In the absence of a sensor for detecting the riding state, the riding state, if occurred, can be eliminated by driving the cassette conveying motor 63 in the reverse rotation direction. Steps S61 to S65 in FIG. 21 are identical with steps S61 to S65 in FIG. 14.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-214121, filed Aug. 22, 2008, which is hereby incorporated by reference herein in its entirety.

What is claimed is:

1. A drive transmission device comprising, a drive source capable of producing a rotational drive force;

a drive transmission unit configured to transmit the rotational drive force of the drive source;

a drive transmission switching mechanism having a sun gear, a planetary gear, and a planetary arm capable of supporting the planetary gear so as to be freely revolvable around the sun gear, the drive transmission switching mechanism being capable of selectively switching the rotational drive force from the drive transmission unit to a plurality of drive transmission destinations;

a plurality of drive input gears capable of transmitting the rotational drive force transmitted from the drive transmission switching mechanism to the drive transmission destinations;

a clutch mechanism capable of switching a revolving state of the planetary gear between a freely revolvable state where the rotational drive force of the sun gear is transmitted to the planetary arm so that the planetary arm is able to rotate and a revolving restricted state where the rotational drive force of the sun gear is not transmitted to the planetary arm so that the planetary arm is unable to rotate; and a revolving state switching unit capable of operating the clutch mechanism by moving the planetary gear in an axial direction of the center of revolution, thereby switching between the revolving restricted state and the freely revolvable state, wherein:

in the revolving restricted state, the planetary gear meshes with the drive input gear, and the clutch mechanism is unable to transmit the rotational drive force;

in the freely revolvable state, the planetary gear is separated apart from the drive input gear, and the clutch mechanism is able to transmit the rotational drive force;

the drive transmission switching mechanism is provided with first and second abutting portions which are configured to come into contact with the planetary arm rotated in the freely revolvable state so as to initialize the revolving position of the planetary gear; and the drive transmission switching mechanism is capable of selecting which one of the first and second abutting portions will come into contact with the planetary arm in accordance with the position of the drive input gear transmitting the rotational drive force among the plurality of drive input gears.

2. The drive transmission device according to claim 1, wherein the drive transmission switching mechanism is controlled to cause the planetary arm to come into contact with the abutting portion disposed closer to the drive input gear among the first and second abutting portions.

3. The drive transmission device according to claim 1, wherein the drive transmission switching mechanism is controlled to cause the planetary arm to successively come into contact with the first and second abutting portions.

4. An ink jet recording apparatus comprising the drive transmission device according to claim 1, which discharges ink to a recording medium, thereby recording data or images on the recording medium.

5. The ink jet recording apparatus according to claim 4, further comprising a carriage for reciprocating a recording head discharging ink, wherein the revolving state switching unit is the carriage.

6. A drive transmission device comprising, conveying means capable of conveying a recording medium;

recording means capable of recording data or images on the recording medium being conveyed by the conveying unit; and a drive transmission device according to claim 1 configured to transmit drive of the drive source to the conveying means.

7. A drive transmission device comprising, a drive source capable of producing a rotational drive force;

a drive transmission unit configured to transmit the rotational drive force of the drive source;

a drive transmission switching mechanism having a sun gear, a planetary gear, and a planetary arm capable of supporting the planetary gear so as to be freely revolvable around the sun gear, the drive transmission switching mechanism being capable of selectively switching the rotational drive force from the drive transmission unit to a plurality of drive transmission destinations;

a plurality of drive input gears capable of transmitting the rotational drive force transmitted from the drive transmission switching mechanism to the drive transmission destinations;

a clutch mechanism capable of switching a revolving state of the planetary gear between a freely revolvable state where the rotational drive force of the sun gear is transmitted to the planetary arm so that the planetary arm is able to rotate and a revolving restricted state where the rotational drive force of the sun gear is not transmitted to the planetary arm so that the planetary arm is unable to rotate; and a revolving state switching unit capable of operating the clutch mechanism by moving the planetary gear in an axial direction of the center of revolution, thereby switching between the revolving restricted state and the freely revolvable state, wherein:

in the freely revolvable state, the planetary gear is separated apart from the sun gear and the drive input gear, the clutch mechanism is able to transmit the rotational drive force, and the revolving state switching unit is moved to a first position where it comes into contact with the drive transmission switching mechanism;

in the revolving restricted state, the planetary gear meshes with the sun gear and the drive input gear, respectively, the clutch mechanism is unable to transmit the rotational drive force, and the revolving state switching unit is moved to a second position where it is separated apart from the drive transmission switching mechanism; and the planetary gear has a revolving standby state where the planetary gear meshes with the sun gear and the drive input gear, respectively, the clutch mechanism is unable to transmit the rotational drive force, and the revolving state switching unit is moved to a third position located between the first position and the second position.

8. The drive transmission device according to claim 7, wherein the drive transmission switching mechanism is controlled so that the rotation direction of the sun gear in the revolving standby state is opposite to the rotation direction of the sun gear in the revolving restricted state switched from the revolving standby state.

9. The drive transmission device according to claim 8, wherein the reverse rotational drive amount of the sun gear in the revolving standby state corresponds to a half of one gear tooth of the planetary gear.

10. A drive transmission device comprising, conveying means capable of conveying a recording medium;

recording means capable of recording data or images on the recording medium being conveyed by the conveying unit; and a drive transmission device according to claim 7 configured to transmit drive of the drive source to the conveying means.

11. A drive transmission device comprising, a sun gear configured to be rotated by a drive source;

a plurality of driven gears;

a planetary gear configured to mesh with the sun gear and selectively mesh with any one of the plurality of driven gears, thereby transmitting drive from the sun gear to any one of the driven gears;

a support member capable of supporting the planetary gear so as to be freely revolvable around the sun gear;

a clutch configured to selectively connect the support member to a shaft of the sun gear driven by the drive source, thereby allowing the support member to revolve;

a first abutting portion configured to come into contact with the support member, thereby restricting a rotatable range of the support member; and a control unit capable of controlling the drive source so that the shaft of the sun gear is connected to the support member by the clutch and that the support member is caused to come into contact with the first abutting portion by the drive source, and the planetary gear is then caused to selectively mesh with any one of the plurality of driven gears.

12. The drive transmission device according to claim 11, wherein the clutch moves the support member in an axial direction of the sun gear, thereby connecting the shaft of the sun gear to the support member.

13. The drive transmission device according to claim 12, wherein when the shaft of the sun gear is connected to the support member by the clutch, the planetary gear having moved together with the support member is moved to a position where it does not mesh with the sun gear.

14. The drive transmission device according to claim 13, when the planetary gear is moved to a position where it meshes with any one of the plurality of driven gears, the connection between the shaft of the sun gear and the support member by the clutch is cut.

15. The drive transmission device according to claim 14, wherein when the connection between the shaft of the sun gear and the support member by the clutch is cut, the sun gear is driven to eliminate a state where the side faces of the teeth of the sun gear are not in mesh with the side faces of the teeth of the planetary gear.

16. The drive transmission device according to claim 15, wherein the clutch is an urging portion capable of urging the support member in a direction for cutting its connection to the shaft of the sun gear.

17. The drive transmission device according to claim 16, further comprising a moving member configured to move the support member against the urging force of the urging portion in order to connect the clutch, wherein when the clutch is disconnected, the moving member is moved to a position where the planetary gear and the sun gear are partially in mesh with each other.

18. The drive transmission device according to claim 11, further comprising a detecting unit for detecting the rotation of the drive source, wherein the control unit detects that the support member comes into contact with the first abutting portion in response to the detecting unit detecting that the drive source stops rotating.

19. The drive transmission device according to claim 11, further comprising a second abutting portion configured to come into contact with the support member, thereby restricting the rotatable range of the support member, wherein the control unit controls the drive source so that the shaft of the sun gear is connected to the support member by the clutch, the support member is caused to come into contact with any one of the first and second abutting portions by the drive source, and the planetary gear is then caused to selectively mesh with any one of the plurality of driven gears.

20. The drive transmission device according to claim 19, wherein when causing the planetary gear to mesh with a predetermined one of the driven gears, the control unit selects and executes either one of an operation wherein the planetary gear is first caused to come into contact with the first abutting portion and then mesh with the predetermined driven gear, or an operation wherein the planetary gear is first caused to come into contact with the second abutting portion and then mesh with the predetermined driven gear, so that the selected operation requires the support member to be pivoted by the smaller amount.

21. An ink jet recording apparatus comprising, conveying means capable of conveying a recording medium;

recording means capable of recording data or images on the recording medium being conveyed by the conveying unit; and a drive transmission device according to claim 11 configured to transmit drive of the drive source to the conveying means.

* * * * *